US012562807B2

(12) United States Patent
Gandy et al.

(10) Patent No.: US 12,562,807 B2
(45) Date of Patent: Feb. 24, 2026

(54) PORTABLE DEPLOYABLE UNDERGROUND COMMUNICATION SYSTEMS, DEVICES AND METHODS

(71) Applicant: Applied Minds, LLC, Burbank, CA (US)

(72) Inventors: Charles L. Gandy, Annapolis, MD (US); Clinton Blake Hope, Los Angeles, CA (US); Edward Francis Adams, Los Angeles, CA (US); Donald Gregory Lariviere, Glendale, CA (US); Houstin L. Lichtenwalner, Macungie, PA (US)

(73) Assignee: Applied Minds, LLC, Burbank, CA (US)

( * ) Notice: Subject to any disclaimer, the term of this patent is extended or adjusted under 35 U.S.C. 154(b) by 0 days.

(21) Appl. No.: 18/593,150

(22) Filed: Mar. 1, 2024

(65) Prior Publication Data

US 2024/0250745 A1 Jul. 25, 2024

Related U.S. Application Data

(60) Continuation of application No. 17/935,227, filed on Sep. 26, 2022, now Pat. No. 11,923,949, which is a
(Continued)

(51) Int. Cl.
*H04B 7/145* (2006.01)
*H04B 7/155* (2006.01)
*H04L 67/12* (2022.01)

(52) U.S. Cl.
CPC ......... *H04B 7/145* (2013.01); *H04B 7/15507* (2013.01); *H04L 67/12* (2013.01)

(58) Field of Classification Search
CPC ..... H04B 7/145; H04B 7/15507; H04L 67/12; H01Q 19/18; H01Q 19/185; H01Q 19/10
See application file for complete search history.

(56) References Cited

U.S. PATENT DOCUMENTS

| | | | |
|---|---|---|---|
| 6,392,791 B1 | 5/2002 | Fork et al. | |
| 6,647,668 B1 | 11/2003 | Cohee et al. | |

(Continued)

*Primary Examiner* — Nguyen T Vo
(74) *Attorney, Agent, or Firm* — Perkins Coie LLP; Michael A. Glenn

(57) ABSTRACT

Disclosed are passive reflector radio communications systems, such as for UHF frequencies or greater than UHF frequencies, and related deployment systems and devices that provide underground communications. Embodiments of the system include reflector elements to provide passive radio communications, structural frameworks to support and orient the reflector elements, methods for calculating reflector size, shape, and position corresponding to a desired wavelength, and deployment methods and devices to install the communication system at a desired location. The passive reflectors can be placed in a folded or otherwise compact mode, for transport into underground tunnels. Once at the desired installation location, the system can be installed, with the reflectors positioned appropriately for the radio frequencies used at the location. Some of the embodiments include any of vertical or horizontal foldable reflector poles, reflective sheets, reflective mesh sheets and/or ropes, inflatable reflective pucks, and rapid deployment systems and methods.

6 Claims, 40 Drawing Sheets

Related U.S. Application Data continuation of application No. 17/139,545, filed on Dec. 31, 2020, now Pat. No. 11,456,799, which is a continuation of application No. 16/730,300, filed on Dec. 30, 2019, now Pat. No. 10,887,000, which is a division of application No. 15/877,281, filed on Jan. 22, 2018, now Pat. No. 10,554,288, which is a continuation of application No. 15/439,761, filed on Feb. 22, 2017, now Pat. No. 9,876,556.

(60) Provisional application No. 62/298,297, filed on Feb. 22, 2016.

(56) References Cited

U.S. PATENT DOCUMENTS

| | | | | |
|---|---|---|---|---|
| 7,019,708 | B2 * | 3/2006 | Regala | H01Q 19/10 |
| | | | | 343/839 |
| 8,055,209 | B1 * | 11/2011 | Dao | H01Q 19/13 |
| | | | | 455/66.1 |
| 2005/0259005 | A1 * | 11/2005 | Chiang | H01Q 25/00 |
| | | | | 342/373 |
| 2009/0156118 | A1 | 6/2009 | Schadler | |
| 2010/0033390 | A1 | 2/2010 | Alamouti et al. | |
| 2010/0103066 | A1 | 4/2010 | Shtrom et al. | |
| 2011/0102261 | A1 | 5/2011 | Egri et al. | |
| 2014/0044042 | A1 | 2/2014 | Moshfeghi | |
| 2014/0313095 | A1 | 10/2014 | Pu et al. | |
| 2015/0094104 | A1 * | 4/2015 | Wilmhoff | H01Q 19/10 |
| | | | | 343/834 |
| 2017/0201018 | A1 | 7/2017 | Nikitin et al. | |
| 2017/0214192 | A1 | 7/2017 | Gibson et al. | |
| 2018/0212334 | A1 * | 7/2018 | Walker | H01Q 3/26 |
| 2018/0299826 | A1 | 10/2018 | Nonaka et al. | |
| 2019/0348759 | A1 | 11/2019 | Walker et al. | |
| 2020/0067197 | A1 | 2/2020 | Tang et al. | |
| 2020/0080546 | A1 | 3/2020 | Von Bargen | |
| 2020/0127389 | A1 | 4/2020 | Li et al. | |
| 2020/0355668 | A1 | 11/2020 | Rehman et al. | |
| 2021/0143546 | A1 | 5/2021 | Lau | |
| 2021/0313669 | A1 | 10/2021 | Ananth et al. | |

* cited by examiner

Assembly
Action
88

Elastic Cord
86

Ferrule
84

80

Dielectric
82 Tube

Reflector
68 Element
Sleeve

62

14a

68
Reflector
Element
Sleeve

Dielectric
82 Tube

64a

64b

120

14a

| Name | Theta | Phi | Ang | Mag |
|------|-------|-------|-------|-------|
| m1 | 90.00 | | 90.00 | 10.30 |
| m2 | | 90.00 | 90.00 | 10.30 |

Curve Info

— dB (Realized Gain Total)
   400MHz: Last Adaptive
   Freq= '0.4GHz' Phi='0deg'

— dB (Realized Gain Total)_1
   400MHz: Last Adaptive
   Freq= '0.4GHz' Theta='90deg'

280

264 Conductive Horizontal Element

264

262 Conductive Vertical Elements

262 Conductive Vertical Elements

Dielectric Support 62

264 Conductive Horizontal Elements

Conductive Horizontal 264 Element

68c

| Name | Theta | Phi | Ang | Mag |
|------|-------|-----|-----|-----|
| m1 | 90.00 | | 90.00 | 10.67 |
| m2 | | 135.00 | 135.00 | 11.89 |

Curve Info

— dB (Realized Gain Total)
  400MHz: Last Adaptive
  Freq= '0.4GHz' Phi='36deg'

— dB (Realized Gain Total)_1
  400MHz: Last Adaptive
  Freq= '0.4GHz' Theta='90deg'

| Name | Theta | Phi | Ang | Mag |
|------|-------|---------|---------|---------|
| m1 | | 90.0000 | 90.0000 | 17.4701 |
| m2 | 90.000 | 90.0000 | 90.0000 | 17.4701 |

Curve Info

— dB (Realized Gain Total)
400MHz: Last Adaptive
Freq= '0.4GHz' Phi='0deg'

— dB (Realized Gain Total)_1
400MHz: Last Adaptive
Freq= '0.4GHz' Theta='90deg'

| Name | Theta | Phi | Ang | Mag |
|------|-------|--------|---------|---------|
| m1 | | 0.0000 | 90.0000 | 15.9257 |
| m2 | 90.000 | | 90.0000 | 15.9257 |

Curve Info

— dB (Realized Gain Total)
400MHz: Last Adaptive
Freq='0.4GHz' Phi='0deg'

— dB (Realized Gain Total)
400MHz: Last Adaptive
Freq='0.4GHz' Theta='90deg'

480

640

14f    14f    14f    14f

680

682

684

14g

| Name | Phi | Ang | Mag |
|------|--------|---------|-------|
| m4 | 45.00 | 45.00 | 10.93 |
| m5 | 90.00 | 90.00 | 10.51 |
| m6 | 135.00 | 135.00 | 10.51 |
| m7 | -46.00 | -46.00 | 10.51 |
| m8 | -90.00 | -90.00 | 10.51 |
| m9 | -135.00 | -135.00 | 10.51 |

14h

Curve Info

— dB (Realized Gain Total)
400MHz: Last Adaptive
Freq= '0.4GHz' Theta='90deg'

—dB (Realized Gain Total)_1
400MHz: Last Adaptive
Freq= '0.4GHz' Phi='90deg'

Balloon Inflation
Unit
902

900

886

68j

904

Gas Storage
(e.g. Helium)

PORTABLE DEPLOYABLE UNDERGROUND COMMUNICATION SYSTEMS, DEVICES AND METHODS

CROSS REFERENCE TO RELATED APPLICATIONS

This application is a continuation of and claims priority to U.S. patent application Ser. No. 17/935,227, filed Nov. 26, 2022, which issued as U.S. Pat. No. 11,923,949 on Mar. 5, 2024, which is a continuation of and claims priority to U.S. patent application Ser. No. 17/139,545, filed Dec. 31, 2020, which issued as U.S. Pat. No. 11,456,799 on Sep. 27, 2022, which is a continuation of and claims priority to U.S. patent application Ser. No. 16/730,300, filed Dec. 30, 2019, which issued as U.S. Pat. No. 10,887,000 on Jan. 5, 2021, which is a divisional of and claims priority to U.S. patent application Ser. No. 15/877,281, filed Jan. 22, 2018, which issued as U.S. Pat. No. 10,554,288 on Feb. 4, 2020, which is a continuation of and claims priority to U.S. patent application Ser. No. 15/439,761, filed Feb. 22, 2017, which issued as U.S. Pat. No. 9,876,556 on Jan. 23, 2018, which claims priority to U.S. Provisional Application No. 62/298,297, filed Feb. 22, 2016, which each is incorporated herein in their entirety by this reference thereto.

GOVERNMENT RIGHTS

This invention was made with government support under subcontract number SUB2015-AM-001-MIN awarded by prime contractor Robotic Research, LLC, under prime contract number W15QKN-14-C-0045 to the Defense Threat Reduction Agency (DTRA). The government has certain rights in the invention.

FIELD OF THE INVENTION

At least one embodiment of the present invention pertains to passive reflectors for wireless communication systems. More particularly, at least one embodiment of the present invention pertains to portable reflector components that can readily be positioned and deployed within a constrained environment, such as within an underground environment, to enable wireless communication between mobile radios.

BACKGROUND

Radio communications in underground and constrained environments such as mine tunnels is a complex challenge. The transmission of radio waves through the earth is limited due to severe attenuation of the signals, and most practical methods for communication use the tunnels themselves as paths for the radio waves. However, as radio waves travel in straight lines, and mine tunnels frequently change direction, curve, or intersect with other tunnels and shafts, it is necessary to install a complex infrastructure of radio equipment within mining tunnels to facilitate reliable communications between operators within the mine shaft and with personnel above ground.

Similar challenges and constraints occur in a variety of environments and situations. Cave exploration, as an example, is carried out in constrained conditions, with little or no knowledge of the terrain and the layout of underground pathways. In such applications, radio signals from an external source will have limited reach, such that repeaters are often needed to ensure communications for the exploring party. In addition to underground complexes, challenging environments for radio communications exist in mountainous and canyon environments. In covert or military operations, there may be an existing radio communications infrastructure; however, it may be unavailable to the military team who may need to operate using different equipment and radio frequencies, as it is unlikely that they will have access to communications systems that may be controlled by potential adversaries.

Mining and underground tunnels are typically highly constrained in terms of space. It is thus valuable to have solutions that are compact or that otherwise take up little volume, especially within the pathways of the tunnels. Tunnels can extend to many kilometers underground, and all equipment must be transported to the installation location, often by operators traveling on foot or using very small vehicles. Equipment that is light and easy to transport is thus also valuable.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
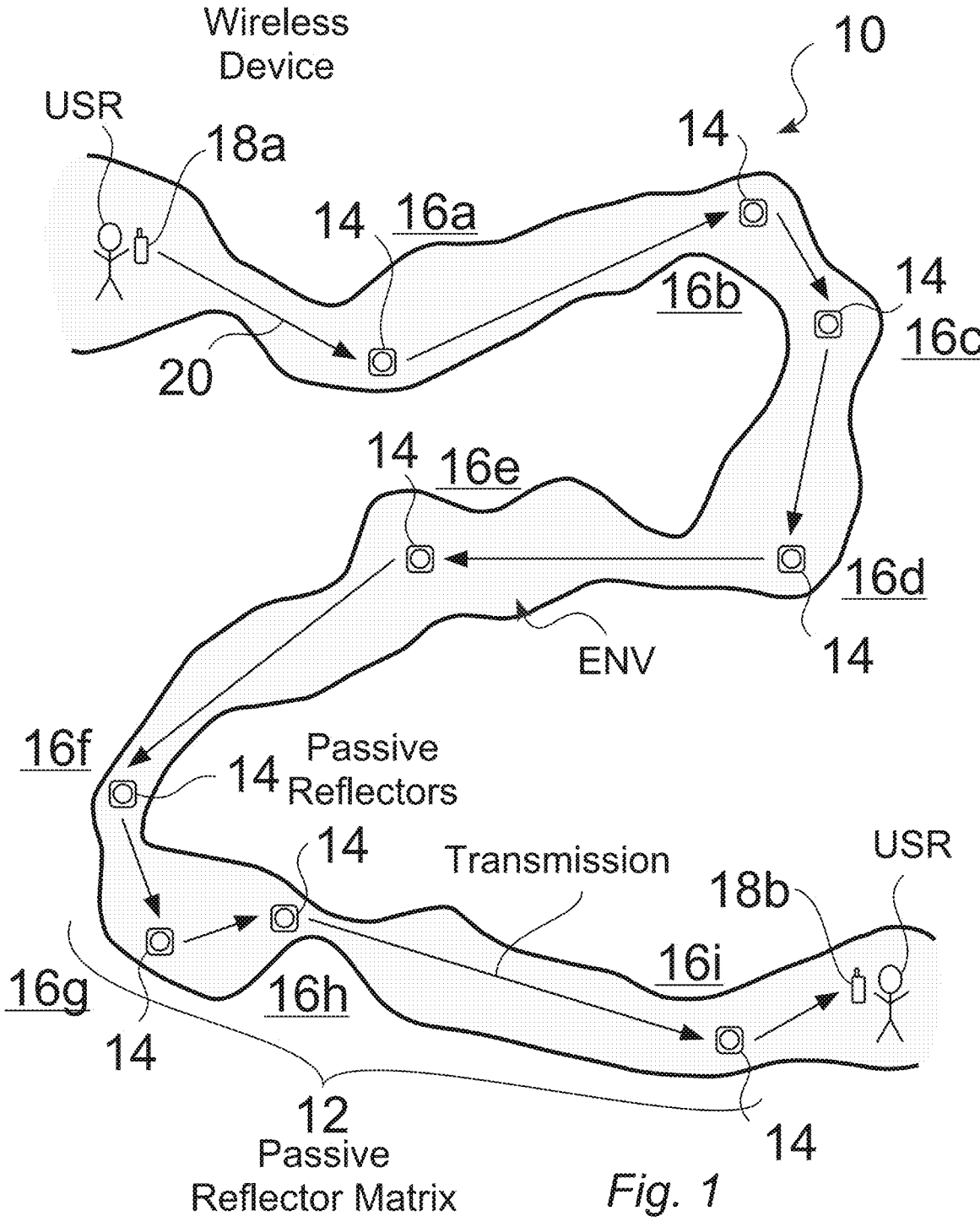
FIG. 1 is a schematic view of illustrative embodiment of a portable deployable underground communication system.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

When radio communications reach the extent of their transmitted range, they may be propagated beyond their initial range through the use of repeaters. Repeaters use antenna reflector elements to receive the transmitted signal and retransmit it. Such retransmission may use the original frequency, signal direction, polarization, and other characteristics, or introduce changes in any or all of these aspects to meet the specific needs of a situation. Repeaters may be active, that is, using electric power to retransmit the received signal, or passive, retransmitting the received signal without the use of electric power. Repeaters are typically designed for specific frequency ranges of operation.

Existing solutions to the problem of radio communications in underground tunnel complexes typically use active repeaters placed at judicious intervals along the tunnels to repeaters require a power source, which must be provided either by electric wiring throughout the tunnel system or by batteries, which then must be monitored and replaced as necessary. Some attempts have been made to use simple passive reflectors, using square sheets of aluminum, in mines.

It is time-consuming and expensive to implement an electrical system in situations where there is an urgent need for communications in a constrained environment, for example during exploration of underground features such as caves and tunnels, in search and rescue operations in collapsed mines or buildings, and in military situations (especially covert military operations) where the surrounding infrastructure may not be in place or may not be accessible to the military users. In certain situations such as the initial exploration or surveying of a convoluted underground complex, it is not possible to implement an active repeater system prior to the survey.

Previous approaches to passive reflectors have been limited, using large flat sheets of aluminum positioned at an angle of 45° to the incident radio wave, and were intended to provide a small extension in range in the context of intersecting cross cuts in mines or large corridors.

It would therefore be advantageous, in underground and constrained environments, to implement a portable, easily deployable, passive radio communications solution. Specifically it would be advantageous to implement portable, easily deployable, passive reflector systems, such as configured to operate in the ultra-high-frequency (UHF) band (300 MHz-3 Ghz range), or in frequencies equal to or greater than the UHF band, e.g., such as up to 5 Ghz.

Disclosed herein are portable, passive radio communications systems, components and related processes that can readily be deployed and used in underground and constrained environments. Certain embodiments provide portable, easily deployable, passive reflector systems, such as configured to operate in the ultra-high-frequency (UHF) band (300 MHz-3 GHz range) or at frequencies equal to or greater than the UHF band, e.g., such as up to 5 Ghz.

The disclosed passive reflector radio communications system typically includes several novel aspects: patterned arrays of reflector elements, structural frameworks to support and orient the reflector elements within the array, methods for the calculation of reflector element and reflector element array size, shape, position, and orientation corresponding to a desired operational frequency, and deployment methods and devices to install embodiments of the invention at the desired location.

In some embodiments, reflector elements that are appropriate for the radio frequencies typically used in mining or other constrained environments can preferably be implemented.

For example, half-wavelength reflector elements can be used, subject to adjustment factors based on the material used in their construction and their size and thickness. The reflector elements can be any of structures such as rods or poles; shapes such as rectangular, square, or similar polygonal strips or panels; constructions such as woven or braided fibers, threads, or wires; and arrangements such as linear, two dimensional, or three-dimensional arrays; individually or in arrays of similar or dissimilar elements.

In some embodiments, the passive reflector elements are supported and can be positioned and oriented by a collapsible framework. The framework members can include spring-loaded struts, inflatable struts, flexible poles, hollow poles, inflatable tubes, foldable sheets, or collapsible ropes. The framework supports the reflector elements and orients it relative to the structure. While the structural framework in illustrative embodiments of the invention is intended to support and orient passive reflector elements, it can be readily envisioned to support and orient active reflector elements as well.

The structures, shapes, constructions, and arrangements of the reflector elements, their positions, and their material composition can be determined based on the desired operational frequencies and the specific propagation characteristics that are desired in the underground environment. For example, the specific embodiments described below use certain materials, dimensions, and positions that are the result of these considerations.

The passive reflector system can be placed in a folded or otherwise compact mode for transport into the tunnels. Once at the desired installation location, the system can be installed and the reflector elements positioned appropriately for the radio frequencies used at the location.

FIG. 1 shows an illustrative view of a passive communication system 10, in which two users USR are considered using wireless devices 18, e.g., 18a, 18b, in an underground tunnel network ENV. The radio communications 20 emitted by the first user's wireless device 18a are propagated 20 using passive reflector elements 14, such as shown at successive locations 16a-16i through the tunnel ENV, so that the communication signals 20 are reflected from successive reflector elements 14, to reach the second user's device 18.

Figure 2:
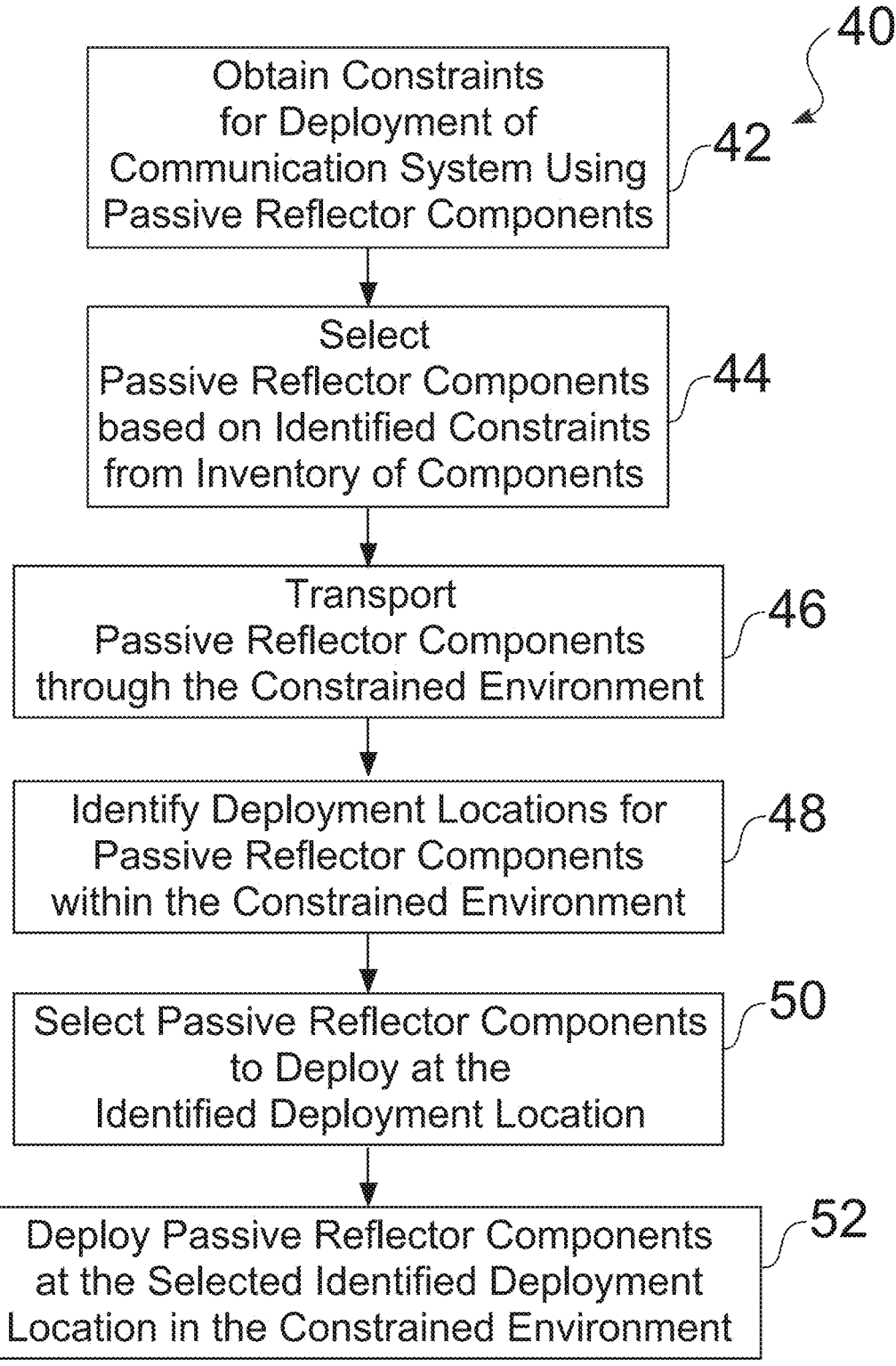
FIG. 2 is a flowchart of an illustrative process for deploying a portable underground communication system.

FIG. 2 is a flowchart of an illustrative process 40 for deploying a portable underground communication system 10. In the illustrative process seen in FIG. 2, constraints for deployment of a communication system 10 using passive reflector components 14 can be obtained 42, in which the constraints can include one or more available modes of transport for the components, such as to be carried by humans, pack animals, vehicles, and/or cable mechanisms. The specific passive reflector components 14 can also be selected 44 from an inventory of available components, such as based on any of identified constraints. The passive reflector components 14 are also typically required to be transported 46 through the constrained environment ENV. Before or at the time of deployment, the locations for deployment of the passive reflector components can be identified 48 and selected 50. Upon deployment 52 of the selected passive reflector components 14, the system 10 can be established or extended within the constrained environment.

Reflector Element and Array Design

Some embodiments of the Illustrative reflector elements in the invention are designed using dipole design principles. A typical antenna dipole is constructed with two conductive segments. A feedpoint between the two conductive segments provides a signal for transmission in the case of a transmitting dipole antenna, and serves as a sink for the received signal in the case of a receiving dipole antenna. Dipoles are high-gain, omnidirectional antennas, and are well suited for use in collinear arrays—a stacked set of vertically aligned dipoles provides high gain in the horizontal plane.

Figure 3:
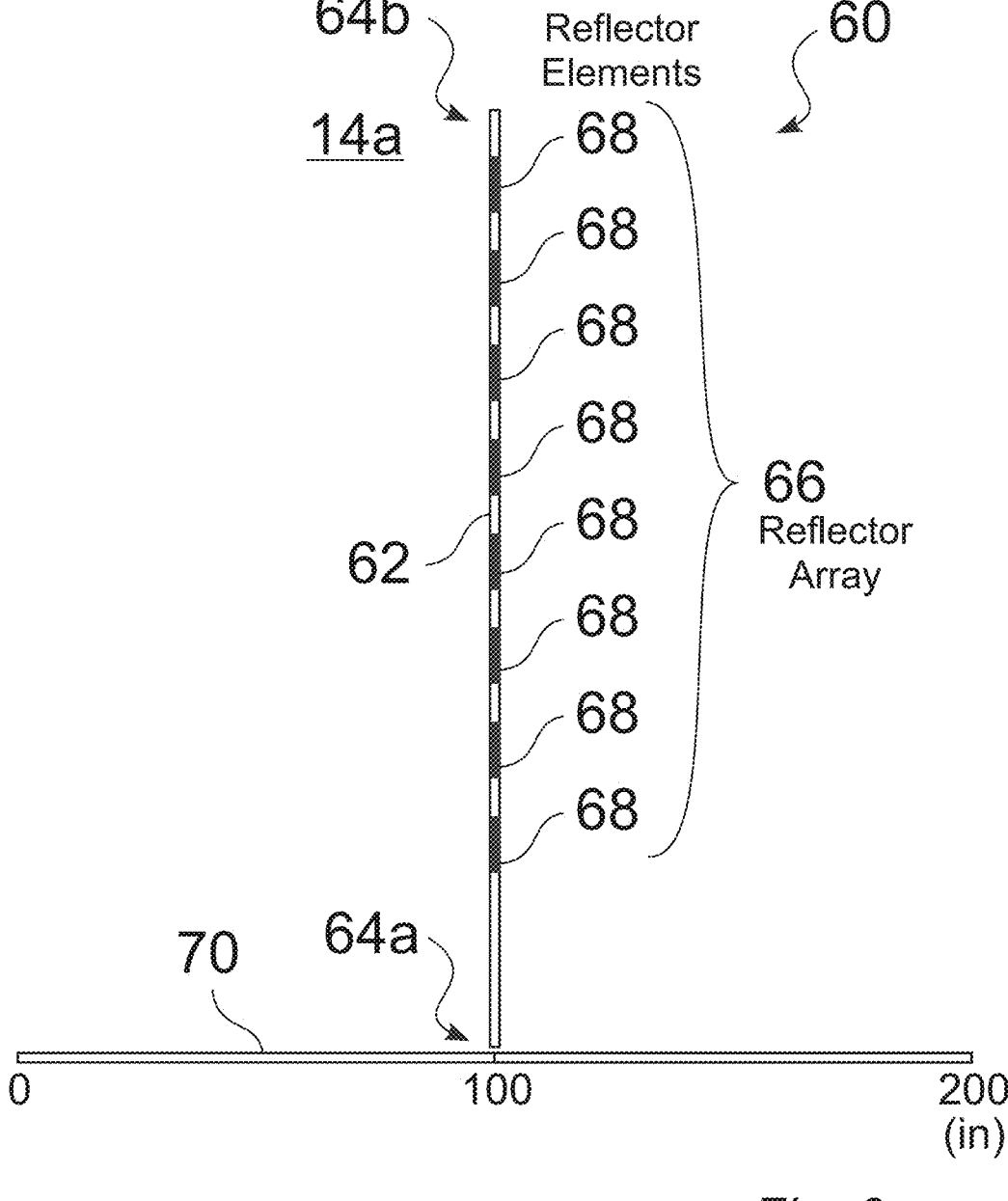
FIG. 3 shows an illustrative embodiment of a passive reflector element that includes a structural pole, and coaxially positioned reflectors.

To obtain such advantages with the use of reflector elements, some illustrative embodiments of the passive reflector components 14 adapt dipole design to that of the reflector, such as seen in FIG. 3. In a passive reflector system 10, the reflector 68 can be considered to be a dipole that is "fed" by an incident wave, and thus does not require a feedpoint to transmit. Further, the received signal 20 is not sunk into the feedpoint, but is instead reradiated. The ends of the dipole segments that would normally be connected to the feedpoint can be connected to each other for simplicity. This approach to reflector element design has advantages in design and construction, and provides a wider bandwidth, especially in higher harmonics. The resulting reflector elements 68 can be stacked, and arranged in collinear arrays 66, such as seen in FIG. 3, for improved gain and directionality due to the interaction between the reradiation patterns from the different elements 68 in the array 66.

Foldable Pole Reflector Component Having Vertical Reflector Elements.

Figure 4:
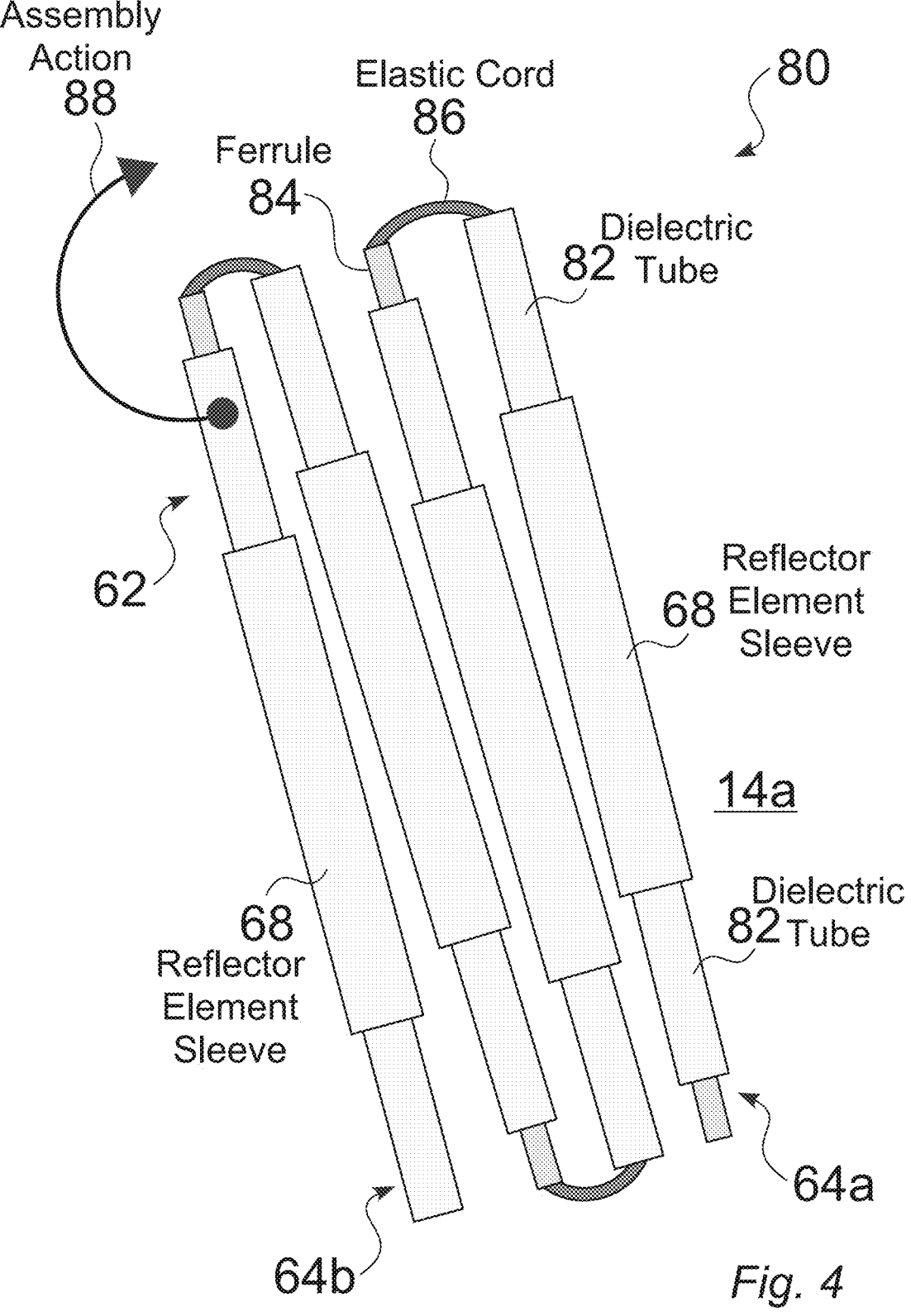
FIG. 4 shows an illustrative embodiment of a storable passive reflector element in an undeployed state.
Figure 5:
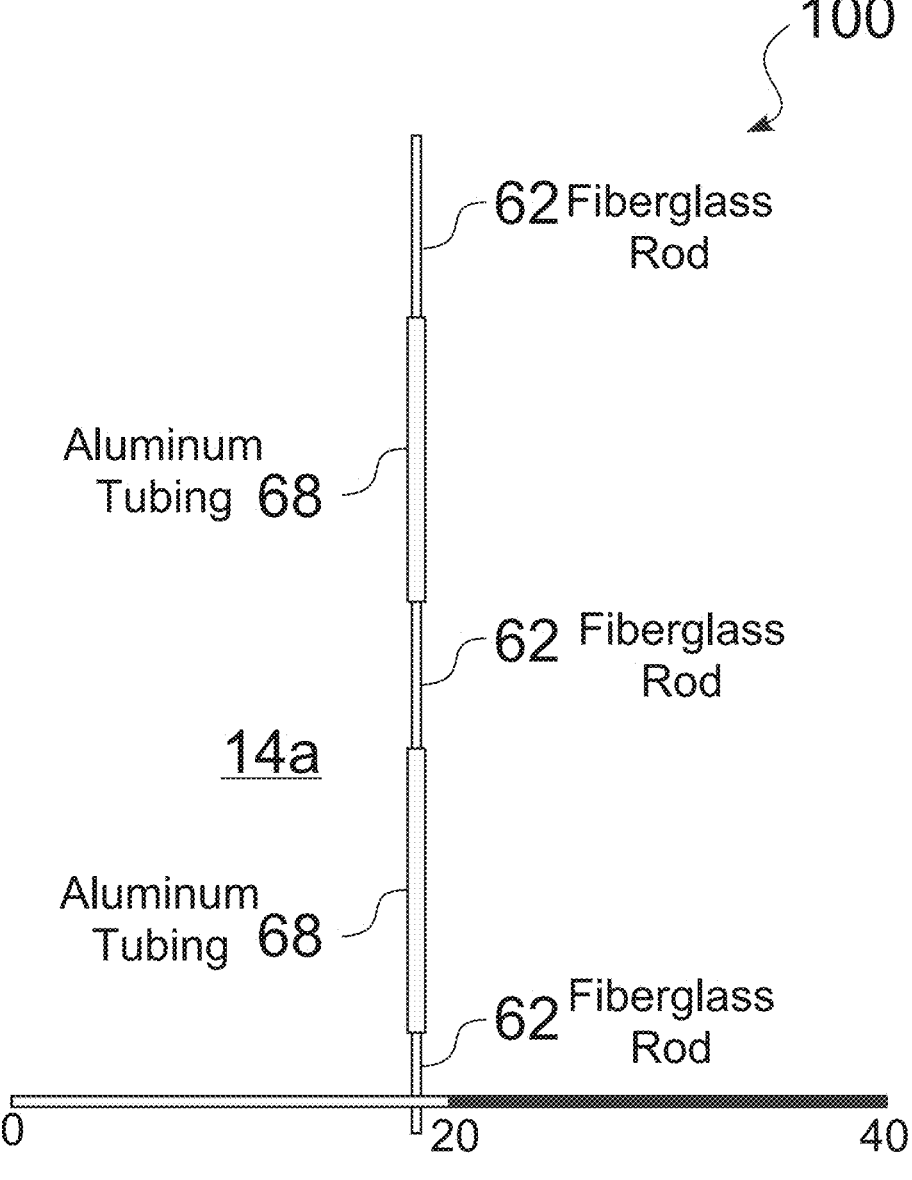
FIG. 5 shows a close-up view of reflector elements for an illustrative embodiment of a passive reflector element.

FIG. 3 shows an illustrative embodiment of a passive reflector components 14a that includes a structural pole 62, and coaxially positioned reflectors 68. FIG. 4 shows an illustrative embodiment of a storable passive reflector component 14a in an undeployed state. FIG. 5 shows a close-up view of reflector elements 68 for an illustrative embodiment of a passive reflector component 14a.

In this embodiment, the structural framework for the passive reflector solution is a foldable pole arrangement, using hollow poles 82 and mating ferrules 84, in which the hollow poles 82 can be made of a suitable dielectric material such as fiberglass. In some embodiments 14a, an elastic cord 86 is run through the hollow fiberglass poles 82, serving as a tensioning mechanism. The tubes 82 can be collapsed and folded, as seen in FIG. 4, for transport and storage, and installed at the location by interconnecting 88 the pole segments 82.

The reflector elements 68 seen in FIGS. 3-5 are vertically positioned along the axis of the structural pole 62. In some embodiments, the reflector elements 68 are preferably hollow cylindrical tubes constructed of a metal, e.g., aluminum, and placed coaxially and around the structural pole 62.

Alternatively, the reflector elements 68 can be constructed using metal or metalized tape affixed around a hollow tube 62 of any of a variety of materials.

The reflector elements 68 can be stacked on the pole 62 as shown in FIG. 3, with an appropriate spacing between them. The length of the reflector elements 68 can be selected to provide resonance at the desired frequency of operation. In some embodiments, the length can preferably approximate half the wavelength (0.5λ) of the signal, as adjusted by an appropriate adjustment factor corresponding to the material of the reflector and its size and thickness. The distance from the center of one reflector 68 element to the center of the next reflector 68 can preferably correspond to approximately 0.75λ adjusted as above.

As an example, a specific implementation of a passive reflector component 14a includes eight aluminum reflector elements 68, fiberglass support poles 62, and can further include an aluminum support base 70.

In some embodiments of the reflector component 14a seen in FIGS. 3-5, to support an illustrative UHF radio frequency of 400 MHz, the length of each reflector element 68 can be optimized to be 13.1" for resonance, using a 0.5λ length, adjusted by an adjustment factor of 0.888. The center-to-center distance between two adjacent reflectors 68 can be optimized to 20.1", or 0.75λ using the same adjustment factor. This arrangement provides a total maximum gain of 10.3 dBi. In such an illustrative embodiment, the antenna dimensions including the support structure are 0.625"×0.625"×198.3" (16.5').

In some embodiments of the reflector component 14a seen in FIGS. 3-5, the reflector component 14a can be placed on the ground within a constrained environment ENV, taking up little space in the tunnel, or, alternatively, mounted on a wall. In some embodiments of the reflector component 14a, the reflector elements 68 are cylindrical so that the signal 20 will be reflected uniformly through all 360 degrees of the horizontal plane, providing coverage in all directions.

Figure 6:
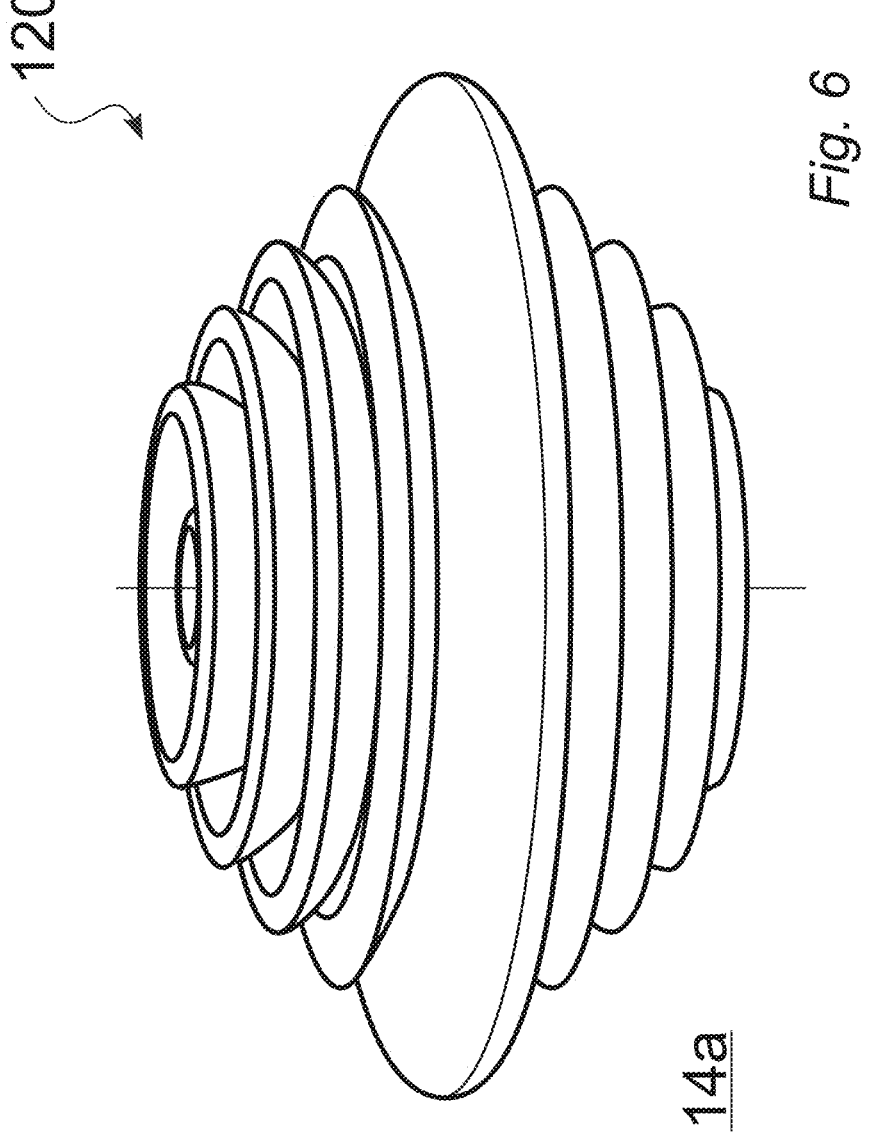
FIG. 6 shows a 3D radiation pattern image for an illustrative embodiment of a passive reflector element having a vertically-aligned structural pole and coaxially positioned reflectors, which provides 360 degree coverage in the horizontal plane.
Figure 7:
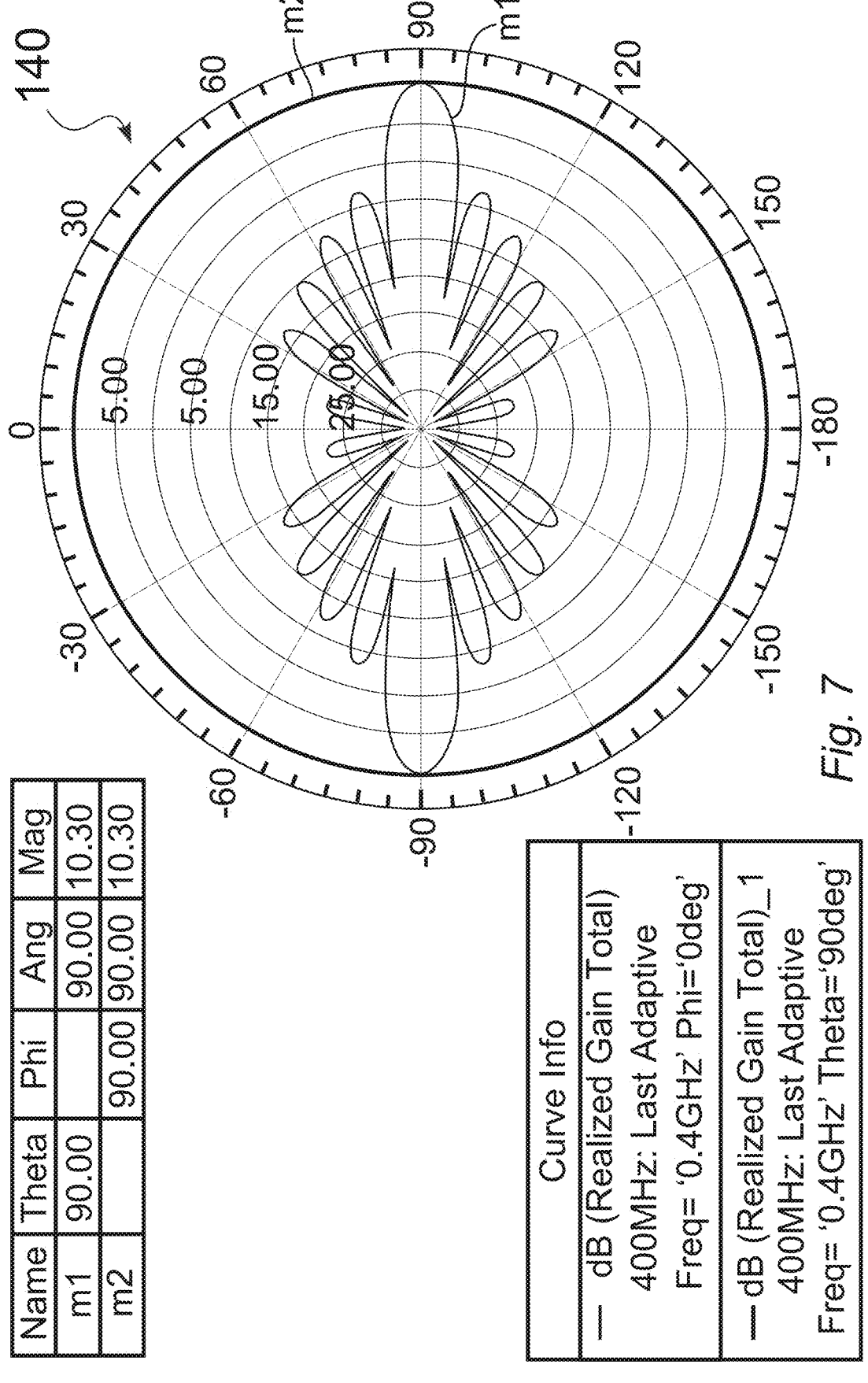
FIG. 7 shows vertical and horizontal radiation patterns for an illustrative embodiment of a passive reflector element having a vertically-aligned structural pole and coaxially positioned reflectors.

FIG. 6 shows a 3D radiation pattern image 120 for an illustrative embodiment of a passive reflector element 14a having a vertically-aligned structural pole 62 and coaxially positioned reflectors 68, which provides 360 degree coverage in the horizontal plane. FIG. 7 shows 140 vertical and horizontal radiation patterns m1 and m2 for an illustrative embodiment of a passive reflector element 14a having a vertically-aligned structural pole 62 and coaxially positioned reflectors 68.

In some alternate embodiments of the passive reflector element 14a, each reflector element 68 can be flat and oriented at a different angle, instead of cylindrical. This arrangement allows each reflector 68 to be directional, and the embodiment can provide a broad range of reflection angles.

Passive Reflector Components Foldable Pole, with Horizontal Reflector Elements.

Figure 8:
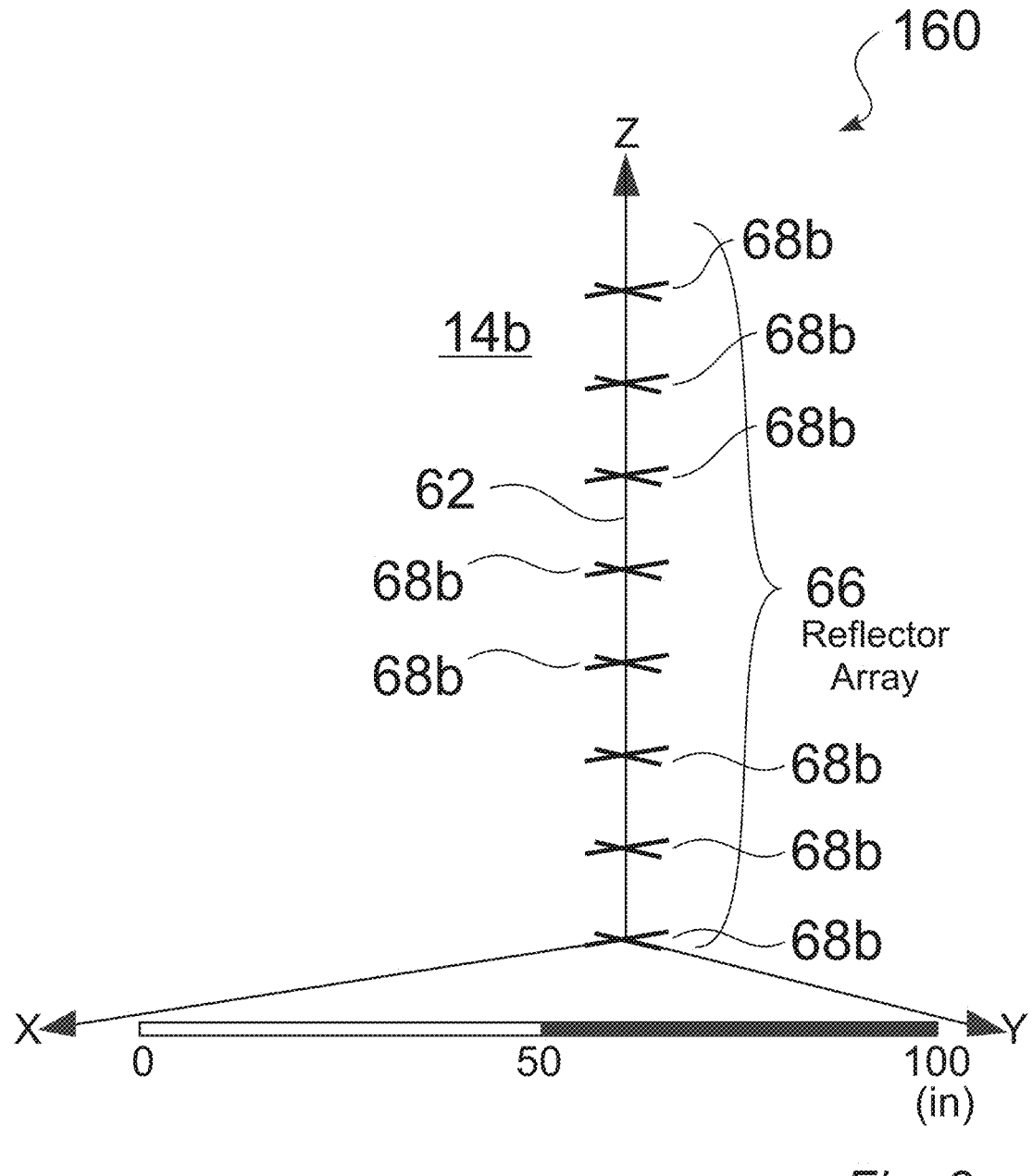
FIG. 8 shows an illustrative embodiment of a passive reflector component having a structural pole with pairs of reflectors in the horizontal plane stacked on the vertical axis.
Figure 9:
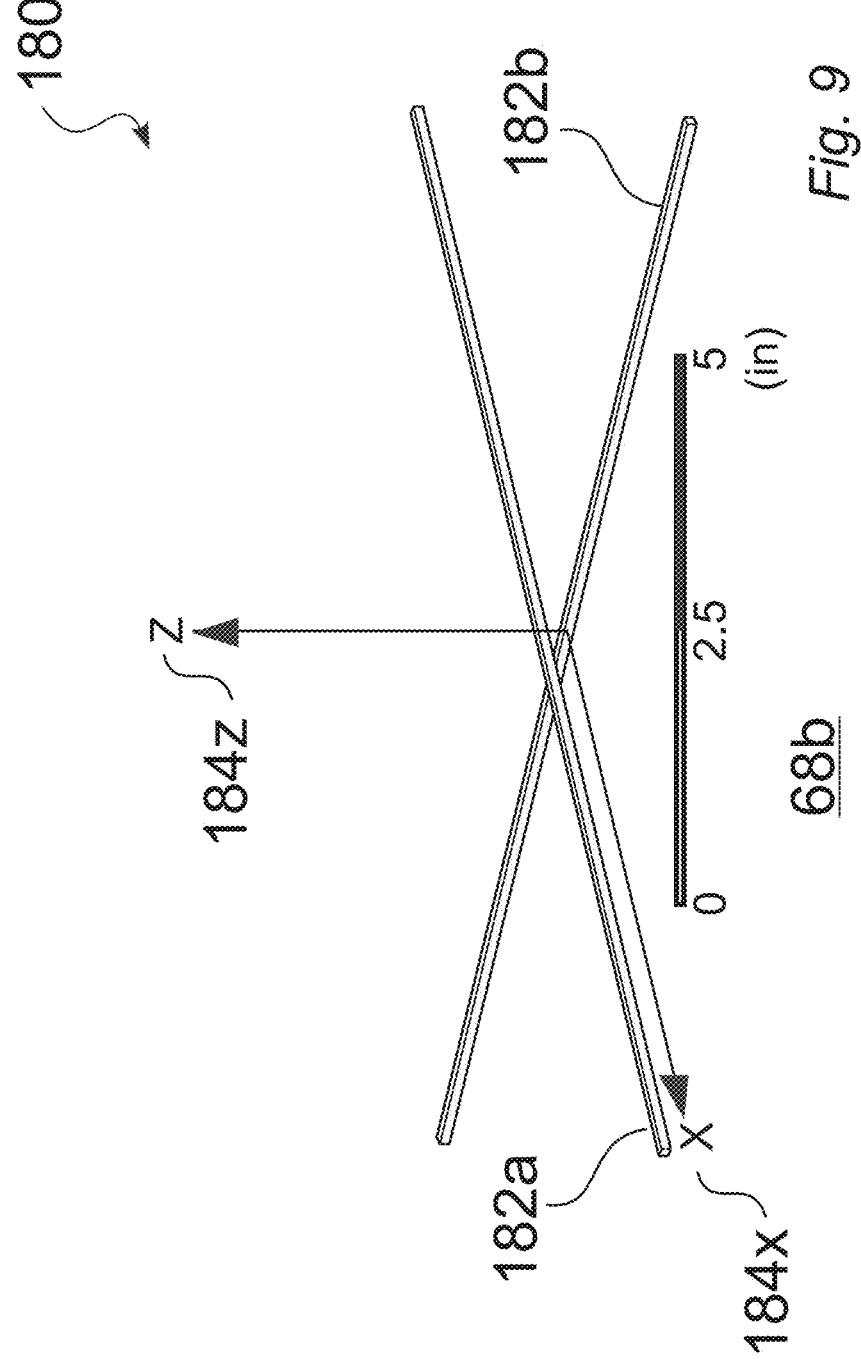
FIG. 9 shows a close up view of the reflector pair of the passive reflector component seen in FIG. 8.

FIG. 8 shows an illustrative embodiment 160 of a passive reflector component 14b having a structural pole 62 with pairs of reflectors 68b in the horizontal plane stacked on the vertical axis Z. FIG. 9 shows a close up view 180 of a illustrative reflector pair 182, e.g. 182a, 182b, of the passive reflector component 14b seen in FIG. 8.

In the illustrative passive reflector component 14b seen in FIG. 8 and FIG. 9, the structural framework 62 for the passive reflector component 14b can be configured as a foldable pole 62, such as discussed above for passive reflector component 14a, using hollow poles made of a suitable dielectric material, e.g., fiberglass. As discussed above, in some embodiments 14b, an elastic cord 86 can extend through mating fiberglass tubes 82, serving as a tensioning mechanism. In this manner, the tubes 82 can be collapsed and folded (FIG. 4) for transport and storage, and assembled 88 installed at the location ENV by interconnecting the pole segments 82.

The reflector elements 68b are vertically positioned along the axis Z 184z (FIG. 9) of the structural pole. In some embodiments, each reflector element 68b includes a pair of crossed metal rods, intersecting at an angle of 90°. In some embodiments of the illustrative passive reflector component 14b seen in FIG. 8 and FIG. 9, the reflector elements 68b can preferably be constructed of a metal, e.g., aluminum. The reflector elements are stacked on the pole 62, with an appropriate spacing between them. In some embodiments, each of the cross-shaped reflector elements 68b are aligned in the horizontal plane and are placed perpendicular to the axis Z 184z of the structural pole 62. The size, shape, spacing, and grouping of the reflector elements 68b can be configured to provide desired reflectivity characteristics for the frequencies involved, i.e., optimized for UHF frequencies of higher than UHF frequencies, e.g., such as but not limited to 2.4 Ghz or 5 Ghz operation.

The length of the reflector elements 68b can be selected to provide resonance at the desired frequency of operation. In some embodiments, the length can preferably approximate half the wavelength (0.5λ) of the signal 20, as adjusted by an appropriate adjustment factor corresponding to the material of the reflector 68b and its size and thickness. In some embodiments of the reflector elements 68b, the vertical distance from one pair of reflector elements 68 to the next pair 68b corresponds to approximately 0.75λ, adjusted as above.

An illustrative implementation of the passive reflector component 14b seen in FIG. 8 and FIG. 9 uses sixteen aluminum reflector elements 68b arranged in eight crossed pairs 182a, 182b, aligned in the horizontal plane, fiberglass support poles 62, and can include an aluminum support base 70 (FIG. 3). To support an illustrative UHF radio frequency of 400 MHz, the reflector element length can be optimized to be 13.8" for resonance, using a 0.5λ length, adjusted by an adjustment factor of 0.935. The vertical distance between two adjacent reflector crossed pairs can be optimized to 20.7", or 0.75λ using the same adjustment factor. This arrangement provides a total maximum gain of 10.9 dBi. In an illustrative embodiment, the antenna dimensions including the support structure are 13.8"×13.8"×180.9" (15'). In some embodiments of the reflector component 14b seen in FIGS. 8 and 9, the reflector component 14b can be placed vertically on the ground within a constrained environment ENV, such as within a tunnel, resulting in a small footprint.

Figure 10:
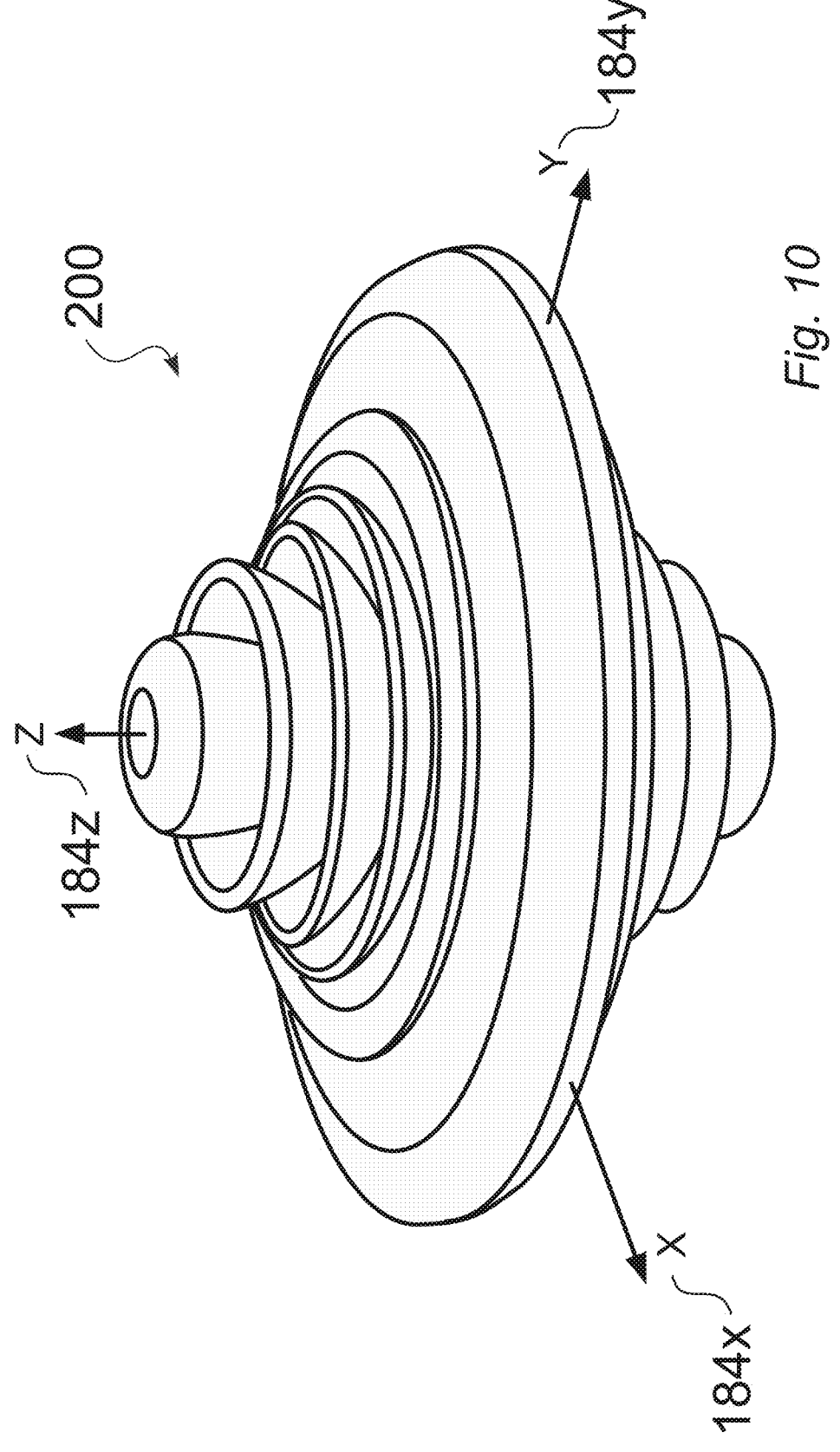
FIG. 10 shows a 3D radiation pattern image for an illustrative embodiment of a passive reflector element having pairs of reflectors in the horizontal plane, which provides 360 degree coverage in the horizontal plane.
Figure 11:
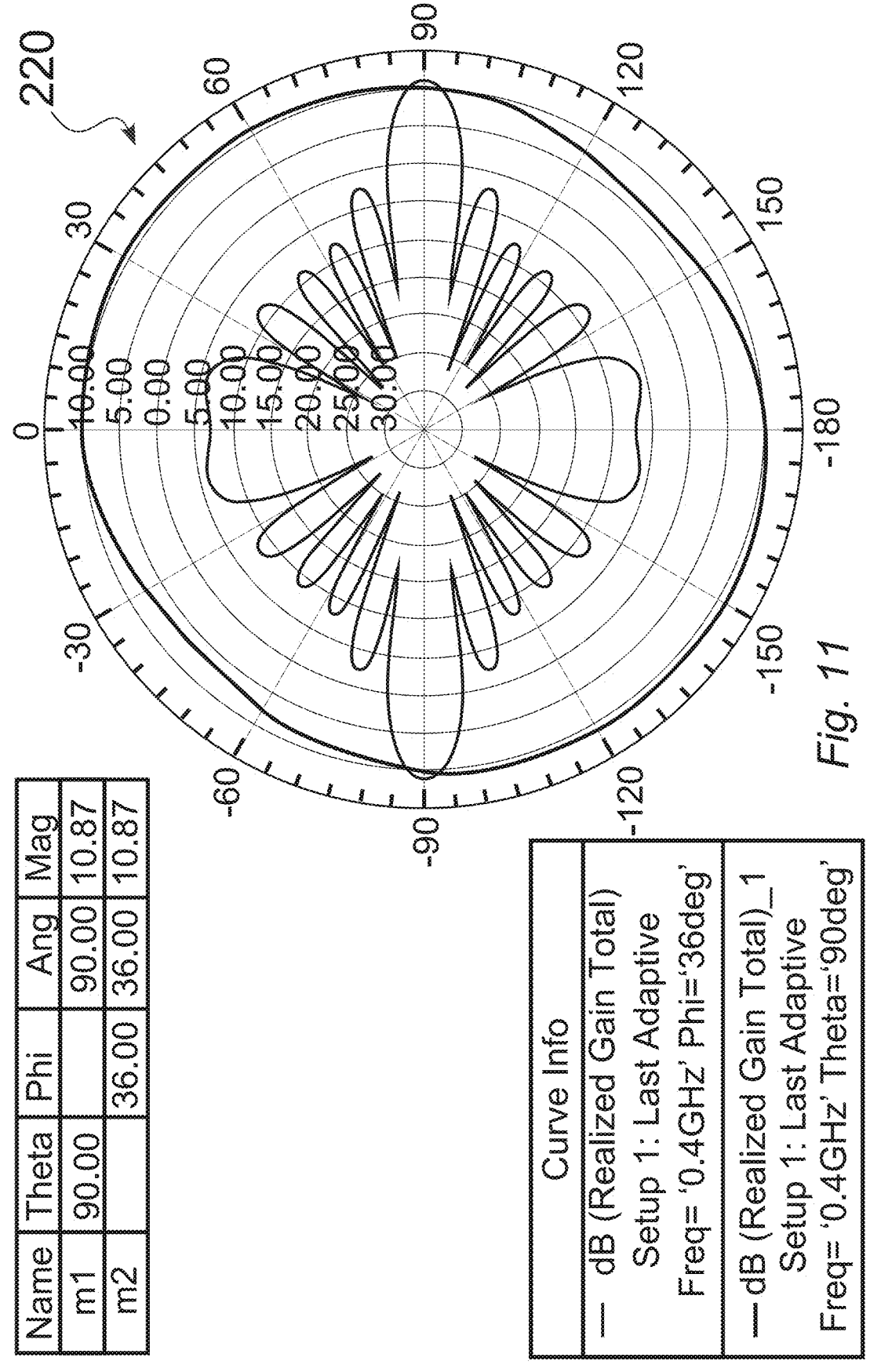
FIG. 11 shows vertical and horizontal radiation patterns for an illustrative embodiment of a passive reflector element having pairs of reflectors in the horizontal plane.

FIG. 10 shows a 3D radiation pattern image 200 for an illustrative embodiment of a passive reflector element 14b having pairs of reflectors 68b in the horizontal plane, which provides 360 degree coverage in the horizontal plane. FIG. 11 is a chart 220 showing illustrative vertical and horizontal radiation patterns m1 and m2 for an illustrative embodiment of a passive reflector element 68b having pairs of reflectors in the horizontal plane. The reflector elements 68b reflect the signal through a 360-degree arc in the horizontal plane with a slightly higher gain in the 45°/–135° axis, providing relatively uniform coverage in all directions.

Passive Reflector Component Having Horizontal and Vertical Reflectors.

Figure 12:
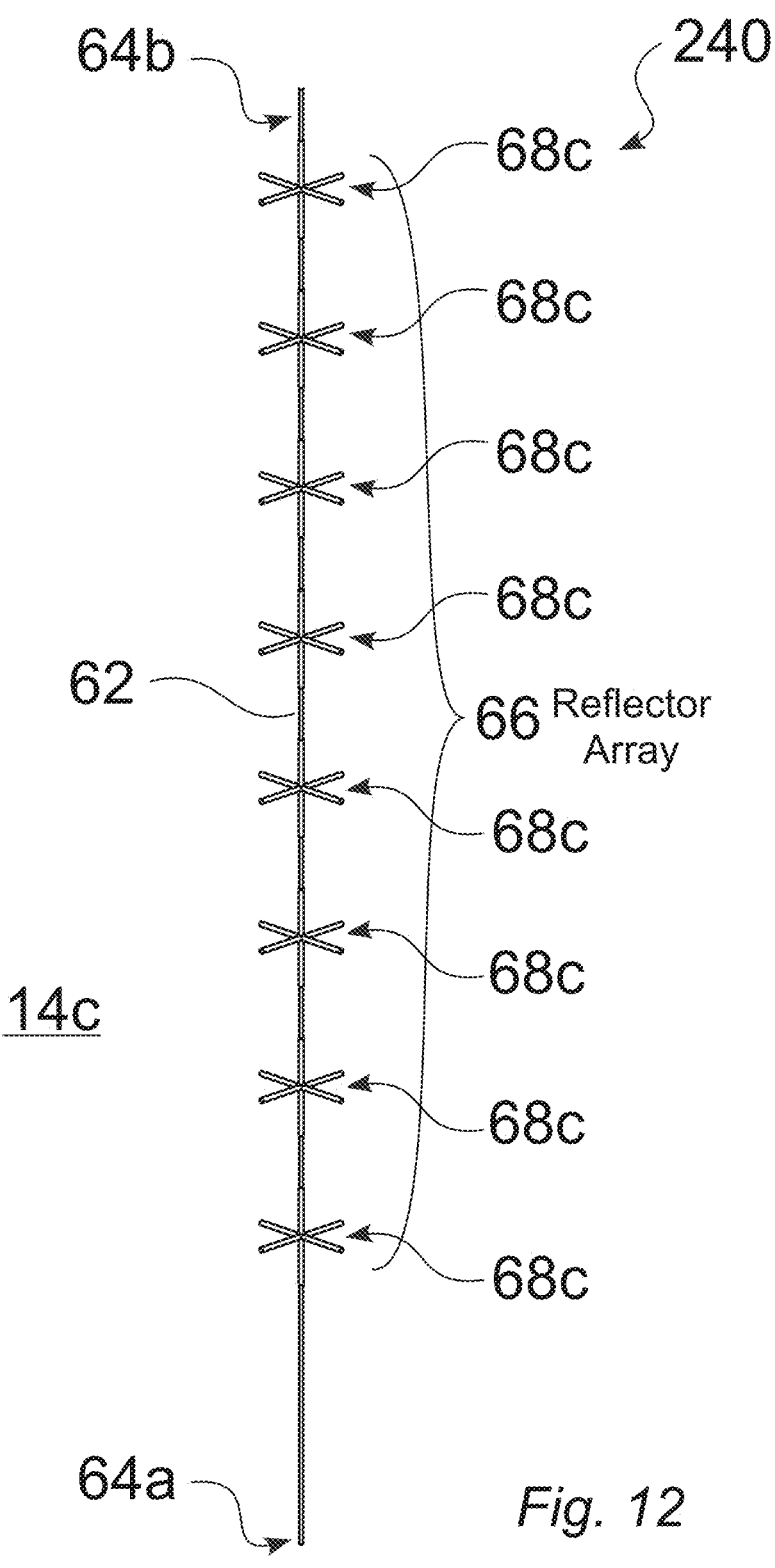
FIG. 12 shows an illustrative embodiment of a passive reflector component having a structural pole with horizontal reflectors and vertical reflectors.
Figure 13:
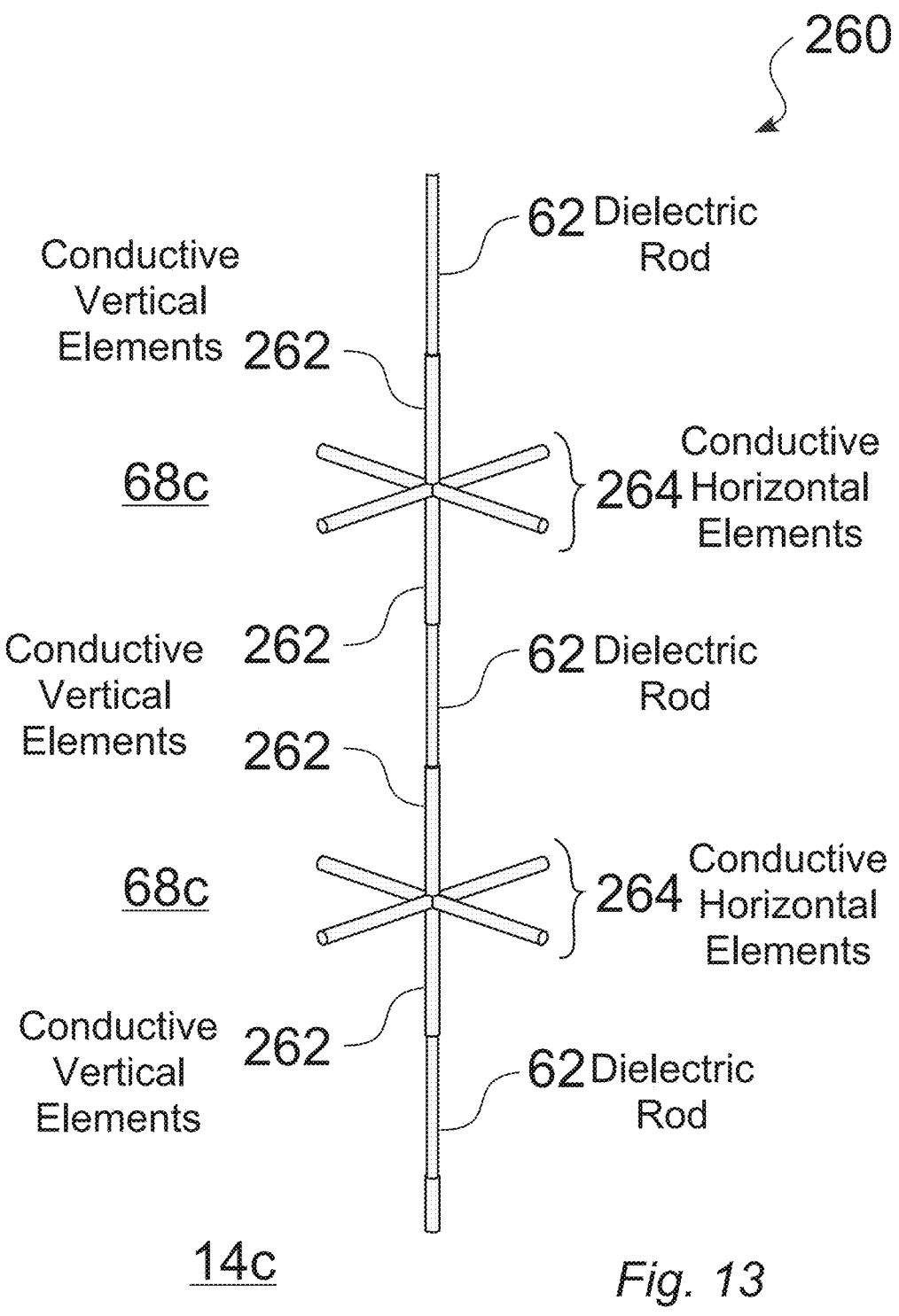
FIG. 13 shows a close-up view of the reflector elements seen in FIG. 12.
Figure 14:
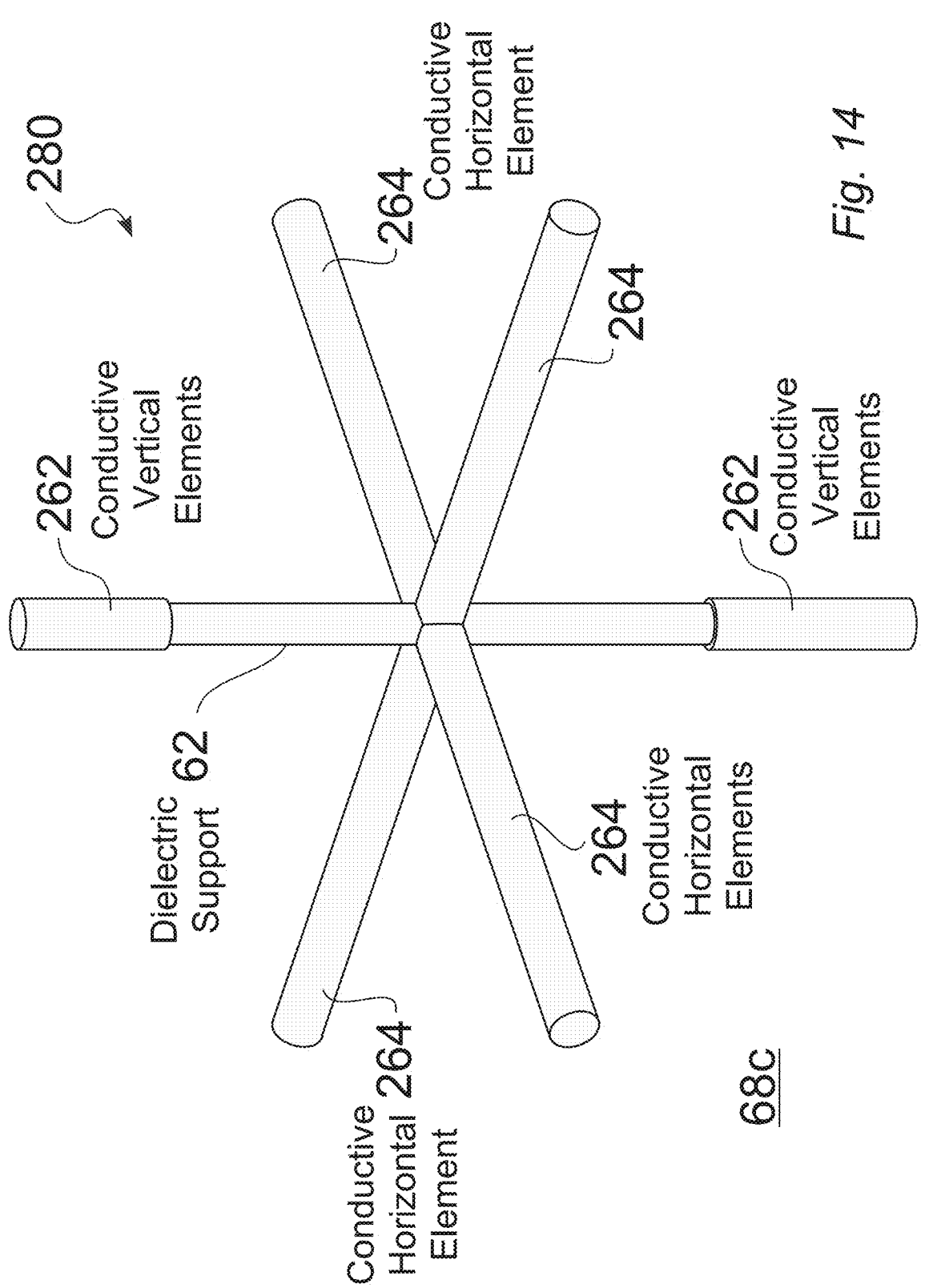
FIG. 14 shows an alternative arrangement of a passive reflector component having a structural pole with horizontal reflectors and vertical reflectors.

FIG. 12 shows 240 an illustrative embodiment of a passive reflector component 14c having a structural pole 62 that includes a combination 68c of horizontal reflectors and vertical reflectors. FIG. 13 shows a close-up view 260 of the reflector elements seen in FIG. 12. FIG. 14 shows an alternative arrangement 280 of a passive reflector component 68c having a structural pole with horizontal reflectors and vertical reflectors.

The illustrative passive reflector components 14c seen in FIGS. 12-14 can be configured as a combination of passive reflector components 14a and 14b. The structural framework for the passive reflector 14c can a foldable pole arrangement, such as seen in FIG. 4, such as using hollow poles 82 made of a suitable dielectric material such as fiberglass. In an illustrative embodiment, an elastic cord 86 is run through the fiberglass tubes 82, serving as a tensioning mechanism. The tubes 82 can be collapsed and folded for transport and storage, and installed at the location by interconnecting the pole segments 82.

The reflector elements 68c are vertically positioned along the axis of the structural pole 62. In the reflector elements 68c seen in FIGS. 12-14, both horizontally-aligned reflector elements 264 and vertically-aligned reflector elements 262 are used.

The horizontally aligned reflector elements 264 can be arranged as a pair of crossed metal rods, intersecting at an angle of 90°. In some embodiments, the reflector elements 262 and/or 264 can preferably be constructed of a metal such as aluminum. The reflector elements 68c are stacked on the pole as shown in FIG. 12, with an appropriate spacing between them. Each of the cross-shaped reflector elements 264 is aligned in the horizontal plane, and is placed perpendicular to the axis Z of the structural pole 62. The size, shape, spacing, and grouping of the reflector elements 262, 264 are configured to provide the desired reflectivity characteristics for the frequencies involved, e.g., UHF or greater that UHF frequencies.

The horizontally aligned reflector elements 262 are combined with vertical reflector elements 264 that are positioned along the axis Z of the structural pole 62. In some embodiments, the vertical reflector elements 262 can include hollow cylindrical tubes constructed of a metal, e.g., aluminum, and placed coaxially and around the structural pole 62. Alternatively, the reflector elements 68c can be constructed using metal or metalized tape affixed around a hollow tube of any of a variety of materials.

The lengths of the reflector elements 68v can be selected to provide resonance at the desired frequency of operation. In some embodiments, the length can approximate half the wavelength (0.5λ) of the signal, as adjusted by an appropriate adjustment factor corresponding to the material of the reflector and its size and thickness. In some embodiments, the vertical distance from one pair of reflector elements to the next pair can correspond to approximately 0.75λ adjusted as above.

An alternative implementation 14c includes horizontal 264 and vertical 262 reflector elements, as illustrated in FIG. 14, wherein the vertical elements 262 are positioned between the horizontal elements 264 instead of being intersected by them.

In a specific illustrative embodiment, the passive reflector component 14c includes 24 conductive reflector elements with 16 reflector elements arranged horizontally in eight crossed pairs 264 aligned in the horizontal plane, 8 reflector elements 262 arranged vertically along the Z axis of the structural framework, 8 dielectric support rods 82 (FIG. 4) made of fiberglass, a dielectric support pole to the base, and an aluminum support base 70 (FIG. 3).

This implementation uses tubular (hollow) ½" outer diameter fiberglass rods 82 that provide support for the ⅝" outer diameter aluminum vertical elements and at the same time dielectrically load the vertical array. This loading provides for shorter vertical element to vertical element spacing (7" end to end at 400 MHz) making the entire array shorter and more compact. The hollow fiberglass rods 82 allow for an elastic shock cord 86 (FIG. 4) to extend through the entire array, providing needed tension for the structure 14c, as well as ease of packing when stowed. In an illustrative embodiment, an exemplary elastic shock cord 86 for stowable embodiments 14 can be Series No. SC Nylon Shock Cord, such as currently available through T. W. Evans Cordage Co., of Cranston RI.

To support an illustrative UHF radio frequency of 400 MHz, the reflector element length in the implementation of FIG. 11 can be optimized for resonance to be 13.8" (horizontal), using a 0.5λ length, adjusted by an adjustment factor of 0.935, and 13.1 (vertical) using an adjustment factor of 0.888. The vertical distance between two adjacent reflector crossed pairs can be optimized to 20.1", or 0.75λ using the same vertical adjustment factor. This arrangement provides a total maximum gain of 11.9 dBi. The antenna dimensions including the support structure are 13.8"×13.8"×198.3. In some embodiments of the reflector component 14c seen in FIGS. 12-14, the reflector component 14c can be placed vertically on the ground within a constrained environment ENV, such as within a tunnel, resulting in a small footprint.

Figure 15:
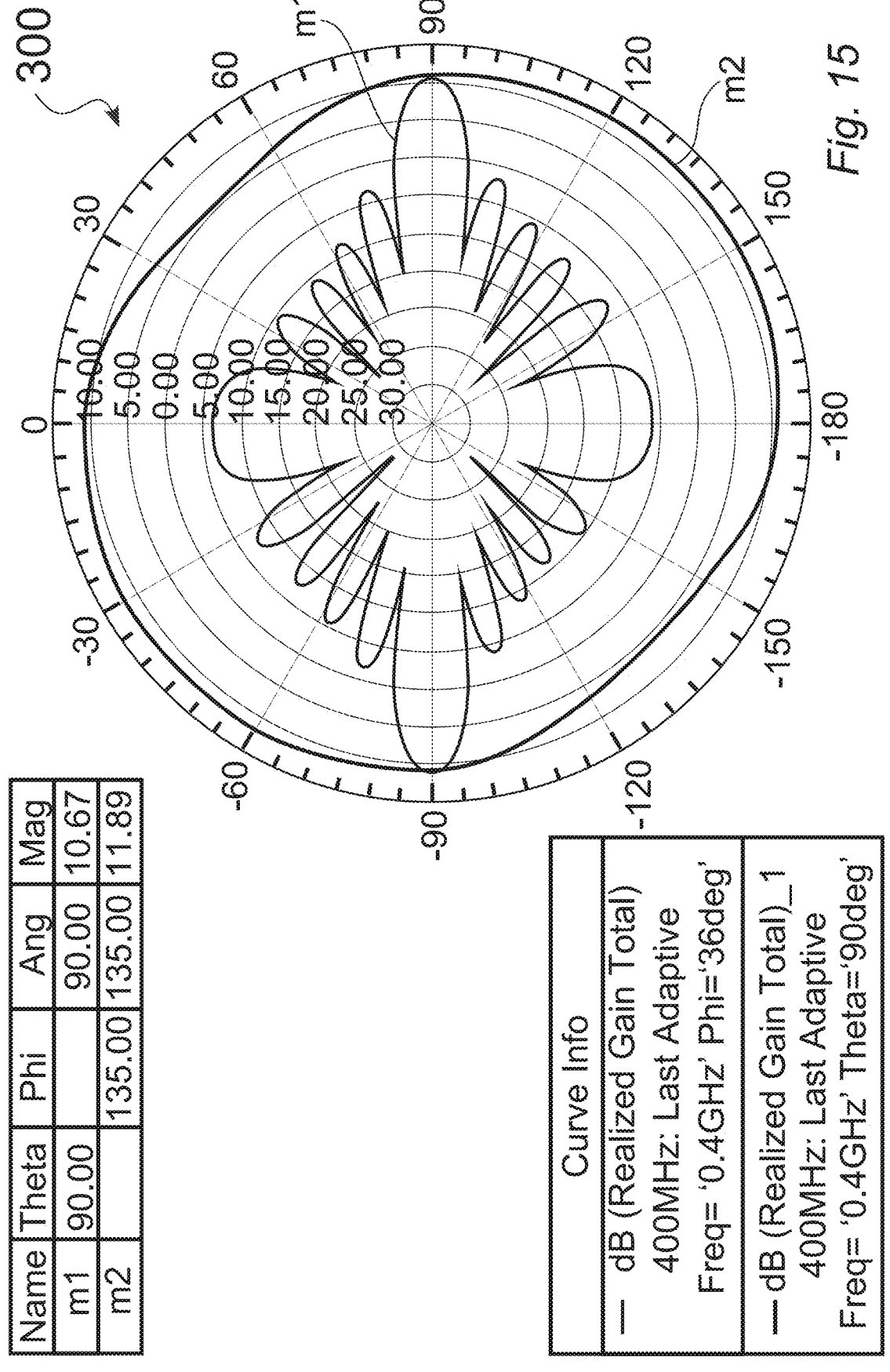
FIG. 15 is a chart that shows vertical and horizontal radiation patterns for an illustrative embodiment of a passive reflector element having horizontal reflectors and vertical reflectors.

FIG. 15 is a chart 300 that shows radiation patterns for vertical m1 and horizontal m2 radiation patterns for an illustrative embodiment of a passive reflector element having horizontal reflectors and vertical reflectors. The reflector elements of a passive reflector element 14c reflect the signal through a 360-degree arc in the horizontal plane with a slightly higher gain in the −45°/135° axis, providing relatively uniform coverage in all directions.

Passive Sheet Reflector Components.

Figure 16:
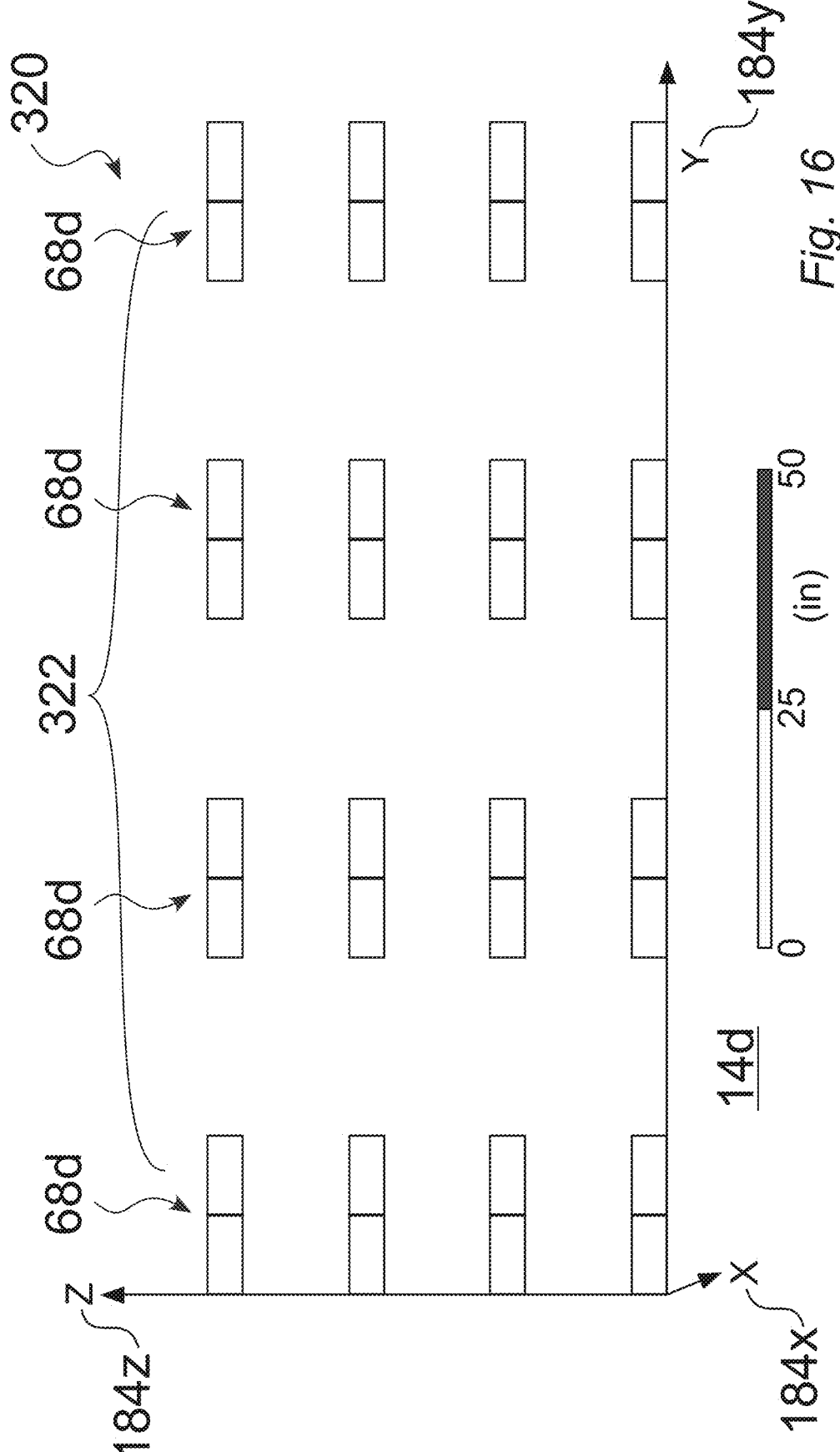
FIG. 16 shows an illustrative passive sheet reflector component that includes reflector elements arranged in a two-dimensional matrix.
Figure 17:
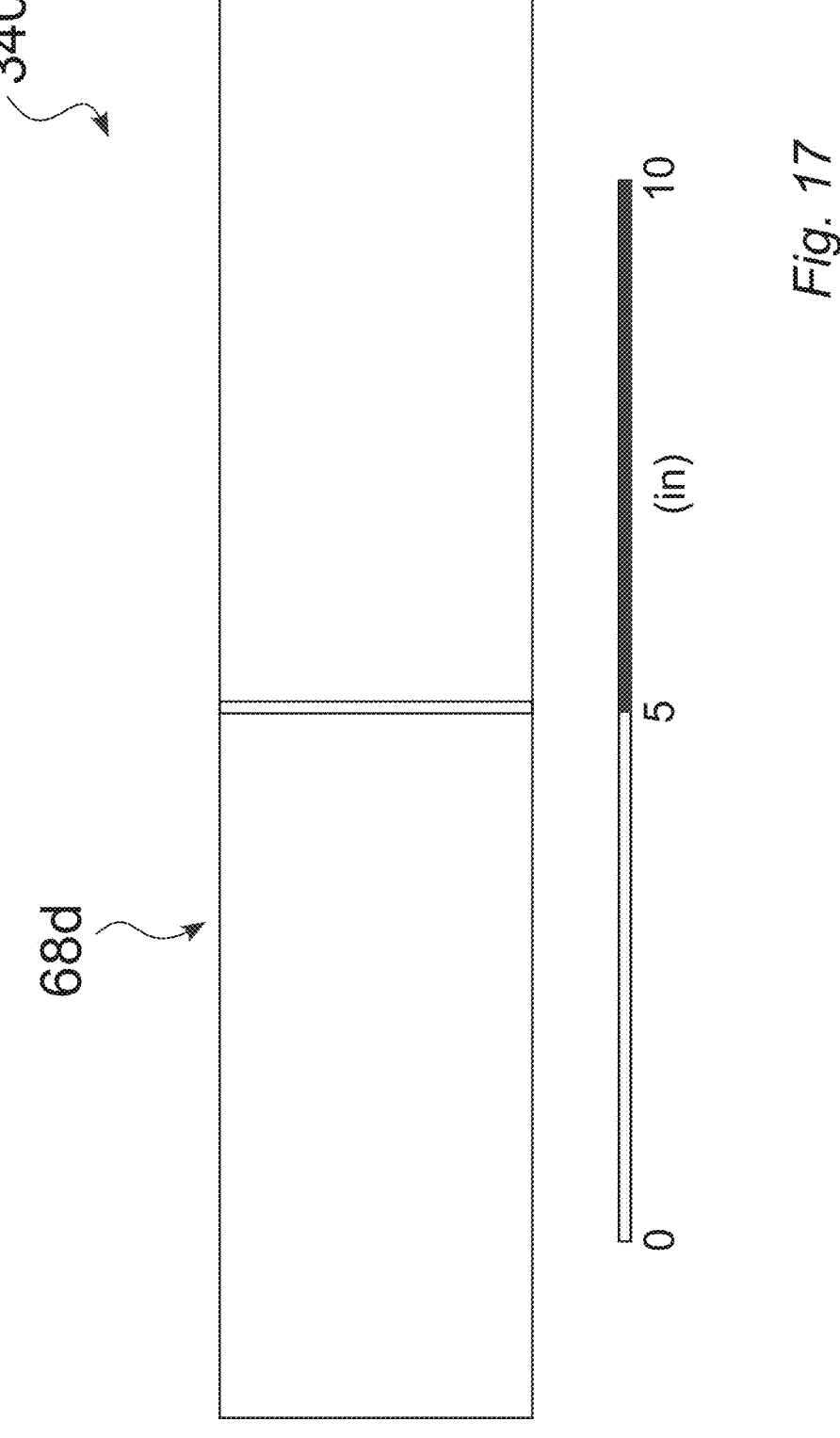
FIG. 17 shows detailed view of a single-reflector element for an illustrative passive sheet reflector component.
Figure 18:
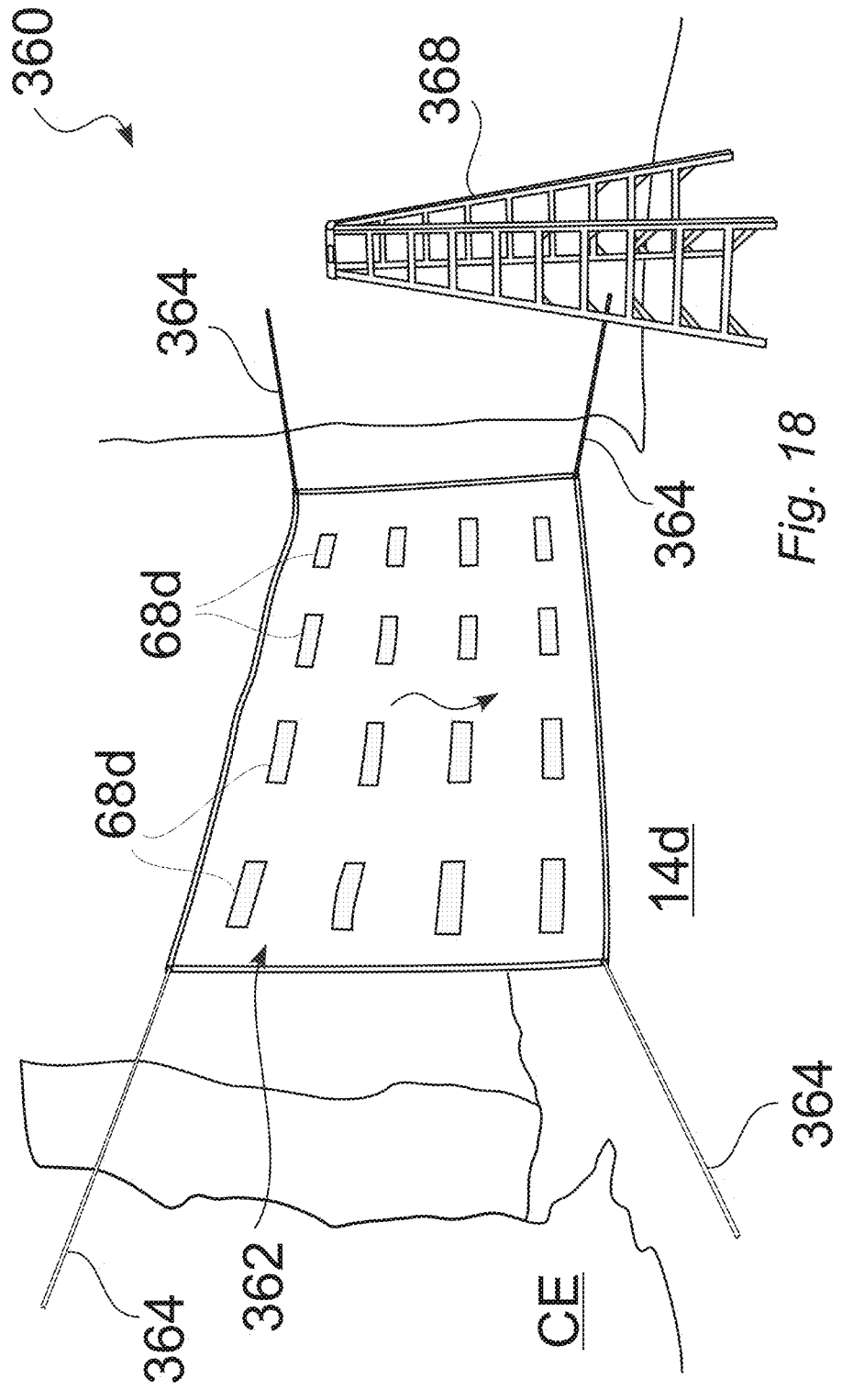
FIG. 18 shows a prototype implementation of an illustrative passive sheet reflector component, including a structural sheet and a 4×4 matrix of copper tape reflector elements.

FIG. 16 shows 320 an illustrative passive sheet reflector component 14d that includes reflector elements 68d arranged in a two-dimensional matrix 322, such as embedded within a flexible sheet backing 362. FIG. 17 shows detailed view 340 of a single-reflector element 68d for an illustrative passive sheet reflector component 14d. FIG. 18 shows 360 a prototype implementation of an illustrative passive sheet reflector component 14d, including a structural sheet 362 and a 4×4 matrix of copper tape reflector elements 68d.

In the passive sheet reflector component 14d seen in FIGS. 16-18, the structural framework for the passive UHF reflector component 14d can be a flat sheet 362, such as a blanket or a tarpaulin made of a suitable dielectric material. The sheet 362 can be folded or rolled into a compact size and shape for ease of transport, and unfolded at the desired installation site.

The reflector elements 68d can be placed in a two-dimensional planar arrangement 322 across the surface of the structural sheet, as shown in FIG. 16. Each reflector element 68d seen in FIG. 16 is a rectangular strip of metal tape affixed to the sheet 362 at a specific location such as shown in FIG. 17. The size, shape, spacing, and grouping of the reflector elements 68d are designed to provide the desired reflectivity characteristics for the frequencies involved, e.g., UHF or greater than UHF. The length of the reflector elements 68d can be selected to provide resonance at the desired frequency of operation. In some embodiments, the length can approximate half the wavelength (0.5λ) of the signal, as adjusted by an appropriate adjustment factor corresponding to the material of the reflector 68d and its size and thickness.

An illustrative embodiment 14*d*, such as seen in FIG. 16, includes sixteen conductive elements 68*d* made of copper tape arranged in a 4×4 rectangular matrix 322, and a plastic tarpaulin as a structural sheet 362 (FIG. 18). To support a desired UHF radio frequency of 400 MHz, the reflector element length can be optimized to be 13.5" for resonance, using a 0.5λ length, adjusted by an adjustment factor of 0.915. In the illustrative embodiment shown in FIGS. 16 and 17, the width of the reflector element 68*d* is 3". The horizontal and vertical distances between two adjacent reflectors can be optimized to 28.5" and 12" respectively. This arrangement provides a total maximum gain of 14 dBi. The total antenna dimensions not including the support structure are approximately 4' by 9'. An illustrative passive sheet reflector component 14*d* can be placed on a wall or suspended as shown in FIG. 18.

Figure 19:
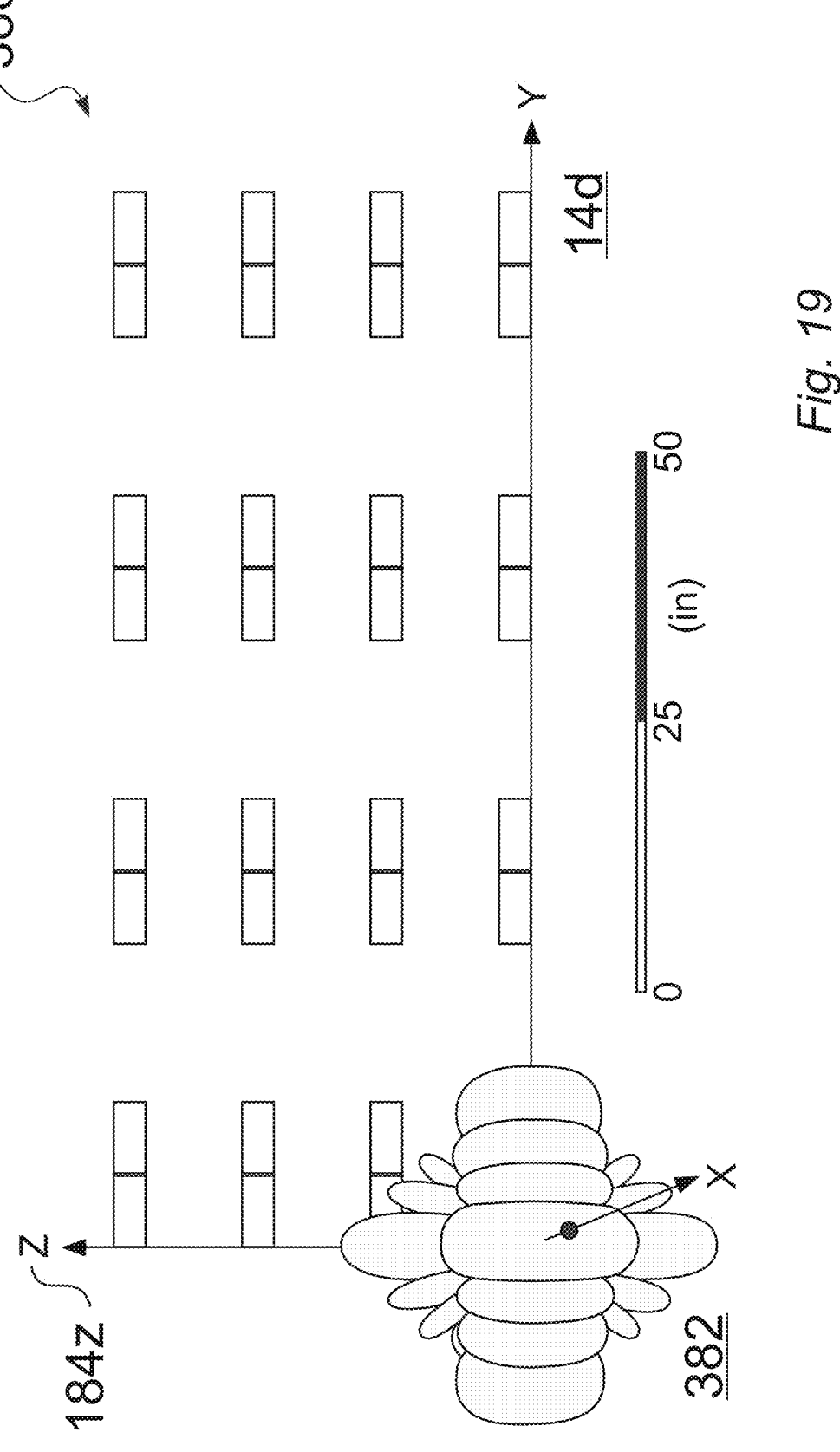
FIG. 19 shows a 3D radiation pattern image for an illustrative embodiment for one reflector element of a passive sheet reflector component.
Figure 20:
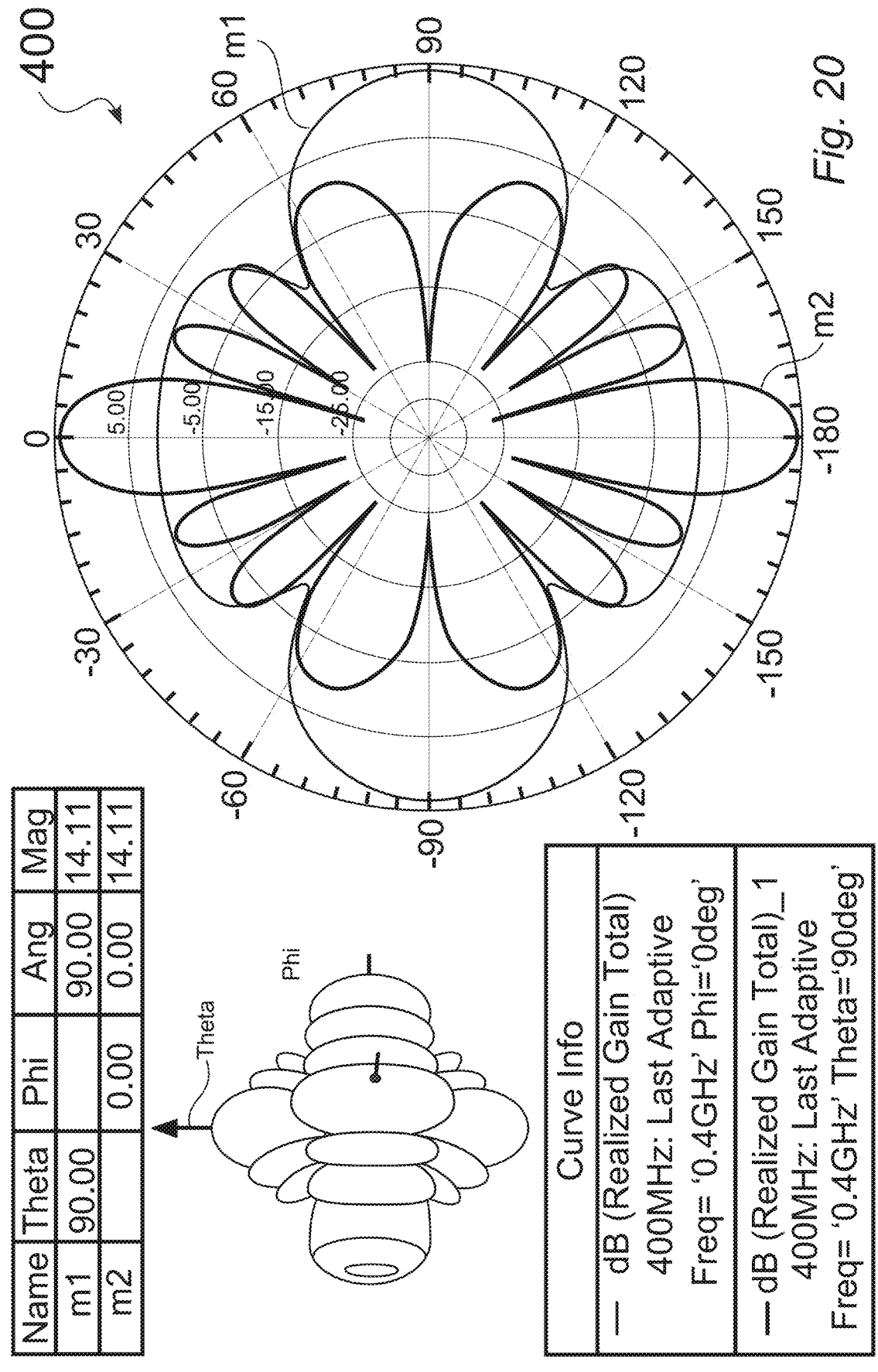
FIG. 20 is a chart that shows vertical and horizontal radiation patterns for an illustrative embodiment of a passive sheet reflector component.

FIG. 19 shows 380 a 3D radiation pattern image 382 for an illustrative embodiment for one reflector element of a passive sheet reflector component 14*d*. FIG. 20 is a chart 400 that shows vertical and horizontal radiation patterns m1, m2 for a UHF signal 20 in an illustrative embodiment of a passive sheet reflector component 14*d*.

Figure 21:
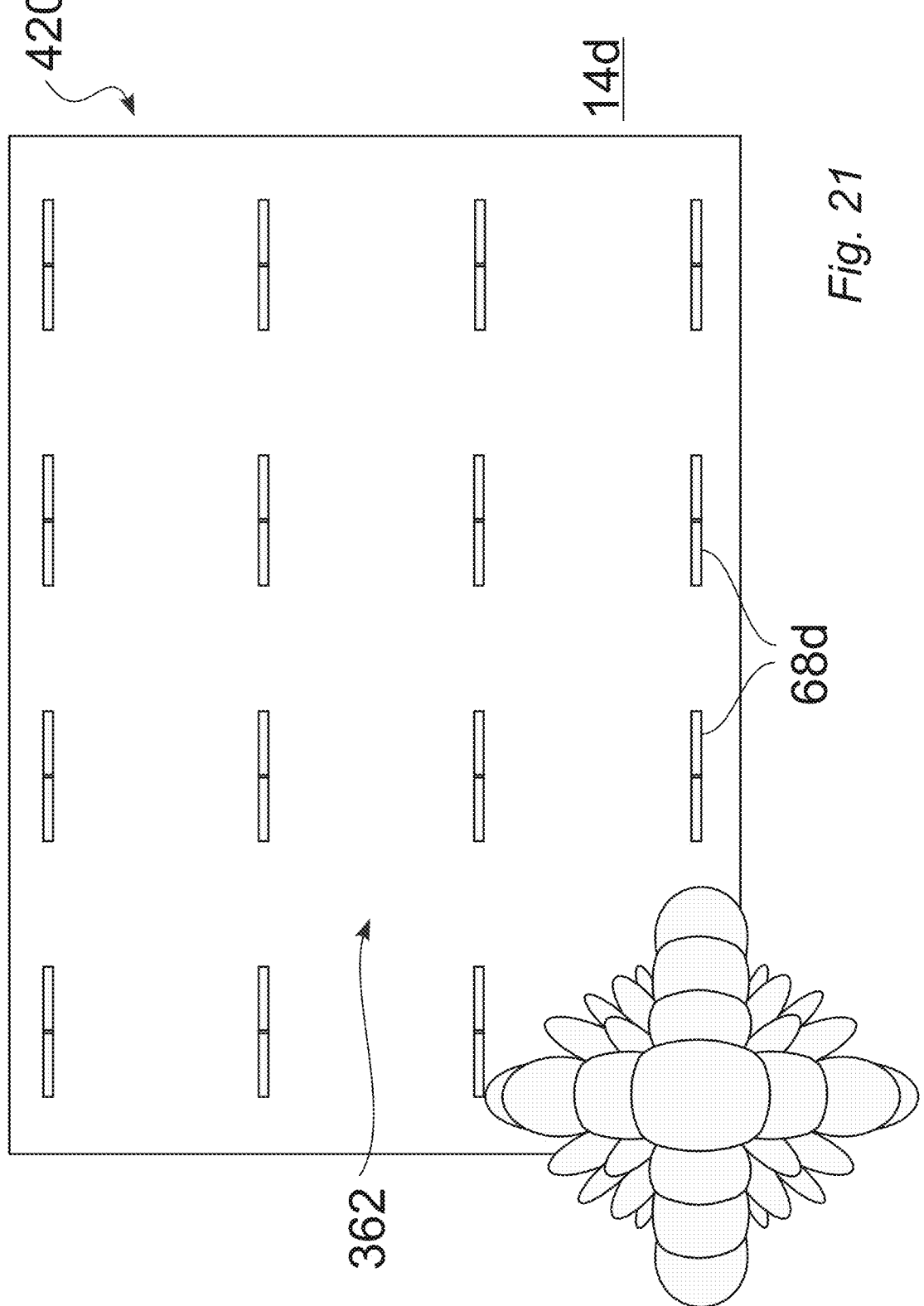
FIG. 21 shows an illustrative view and a 3D radiation pattern image for an alternate implementation of an illustrative embodiment for one reflector element of a passive sheet reflector component.
Figure 22:
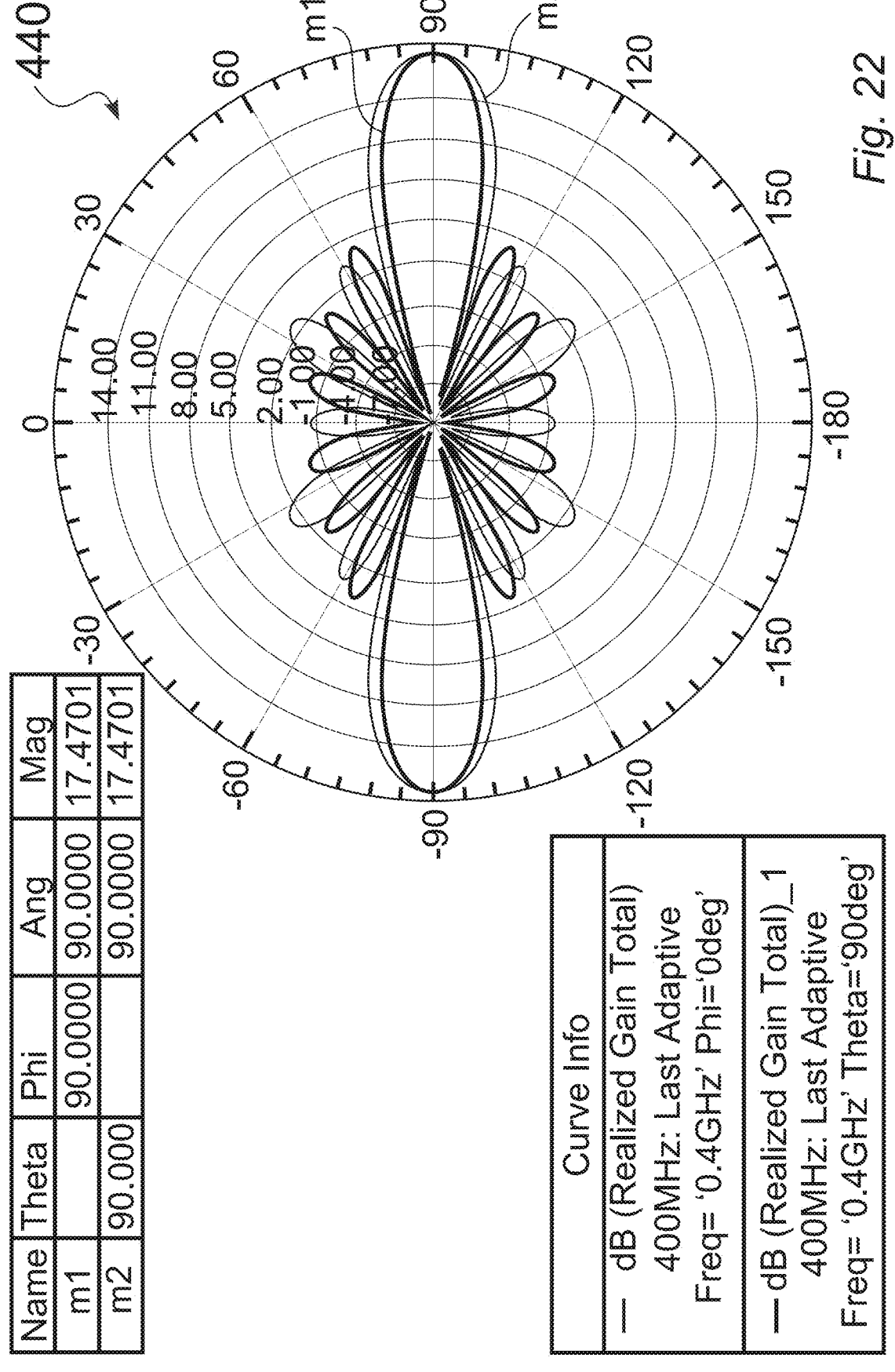
FIG. 22 is a chart that shows vertical and horizontal radiation patterns for an alternate implementation of an illustrative embodiment for one reflector element of a passive sheet reflector component.

FIG. 21 provides a schematic view 420 of an alternate passive sheet reflector component 14*d*, and shows a 3D radiation pattern image for a corresponding reflector element 68*d*. FIG. 22 is a chart that shows vertical and horizontal radiation patterns for a reflector element of the alternate passive sheet reflector component 14*d* shown in FIG. 21. The alternate passive sheet reflector component 14*d* includes sixteen conductive elements 68*d* made of copper tape arranged in a 4×4 rectangular matrix, and a plastic tarpaulin 362 as a structural sheet. To support an illustrative UHF radio frequency of 400 MHz, the reflector element length can be optimized to be 13.5" for resonance, using a 0.5λ length, adjusted by an adjustment factor of 0.915. The width of the reflector element is 1". The horizontal and vertical distances between two adjacent reflectors 68*d* can be optimized to 21.5" and 13" respectively. This arrangement provides a total maximum gain of 17.5 dBi. The total antenna dimensions not including the support structure are 93"×68.5"×0.01". The alternate passive sheet reflector component 14*d* provides greater directionality and gain, as shown by the radiation patterns in FIG. 21 and FIG. 22.

Figure 23:
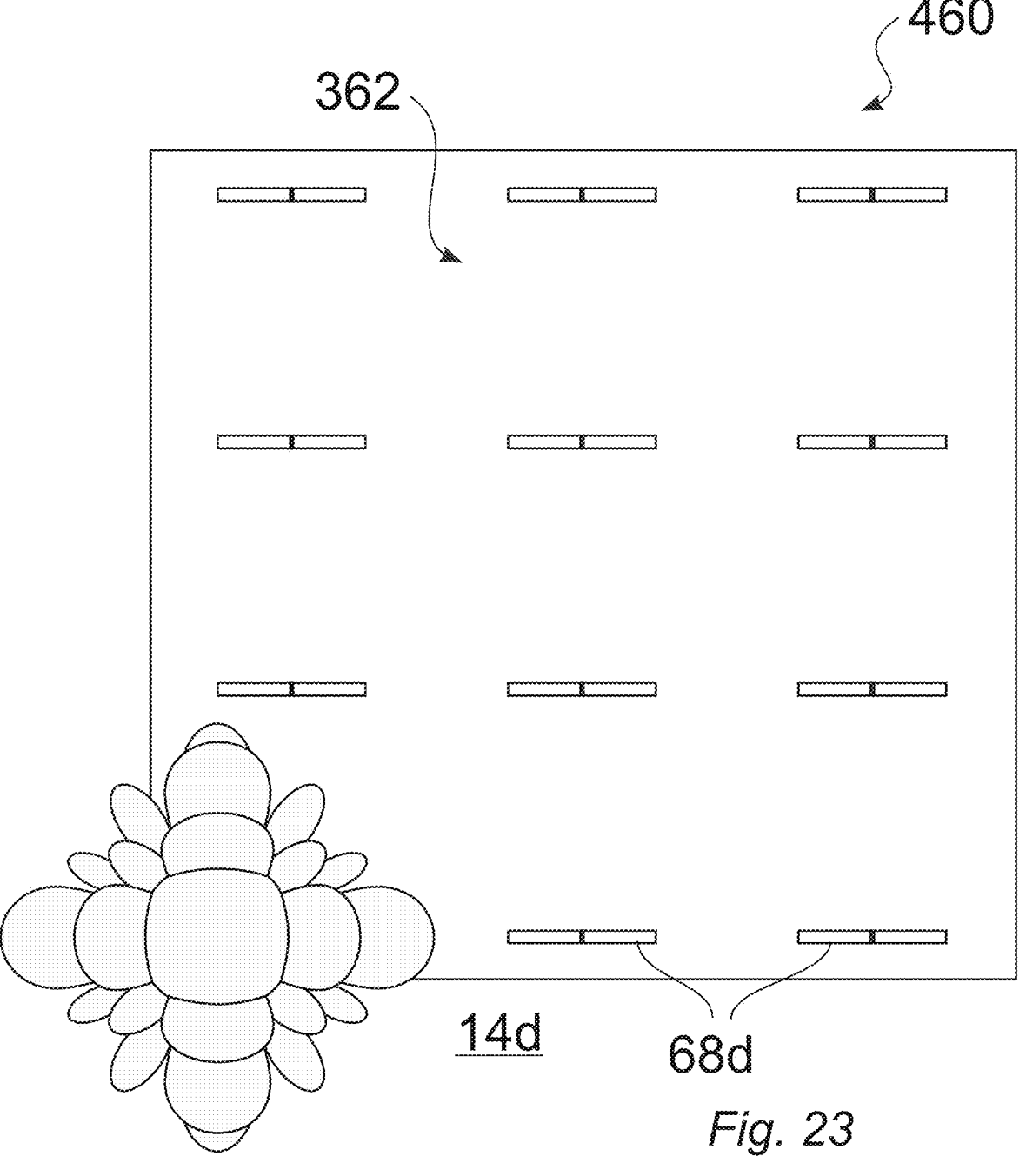
FIG. 23 shows an illustrative view and a 3D radiation pattern image for a further implementation of an illustrative embodiment for one reflector element of a passive sheet reflector component.
Figure 24:
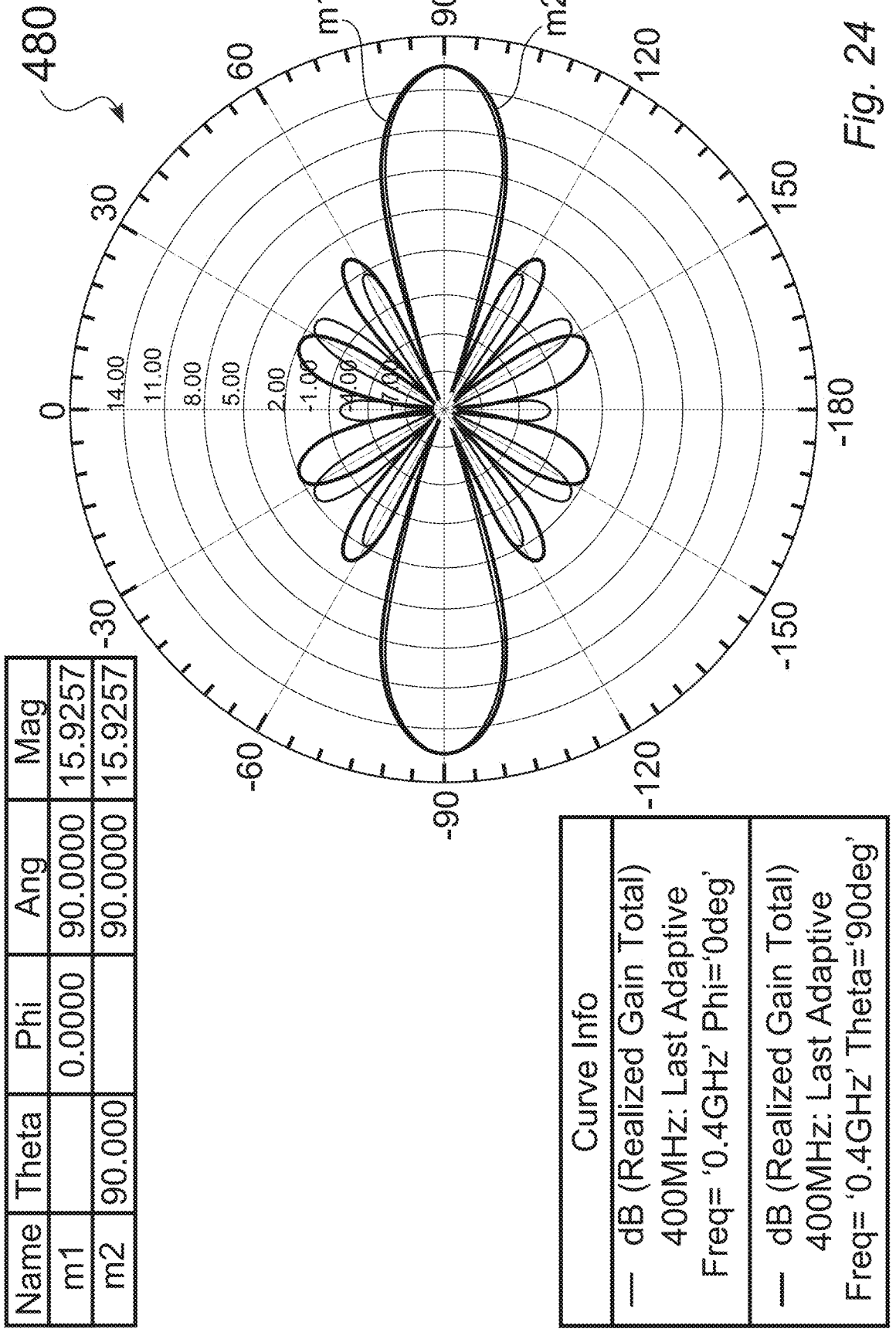
FIG. 24 is a chart that shows vertical and horizontal radiation patterns for the implementation of an illustrative embodiment for one reflector element of a passive sheet reflector component shown in FIG. 23.

A further implementation of a passive sheet reflector component 14*d*, as shown in FIGS. 23 and 24, includes twelve conductive elements 68*b* made of copper tape arranged in a 3×4 rectangular matrix, and a plastic tarpaulin 362 as a structural sheet. To support an illustrative UHF radio frequency of 400 MHz, the reflector element length can be optimized to be 13.5" for resonance, using a 0.5λ length, adjusted by an adjustment factor of 0.915. The width of the reflector element is 1". The horizontal and vertical distances between two adjacent reflectors 68*d* can be optimized to 21.5" and 13" respectively. This arrangement provides a total maximum gain of 15.9 dBi. The total antenna dimensions not including the support structure are 66.5"×68.5"×0.01". The illustrative passive sheet reflector component 14*d* shown in FIGS. 23 and 24 provides greater directionality and gain, as shown by the radiation patterns. Passive Reflector Components Having Patch Antenna Panels with Ground Plane.

Figures 25A, 25B:
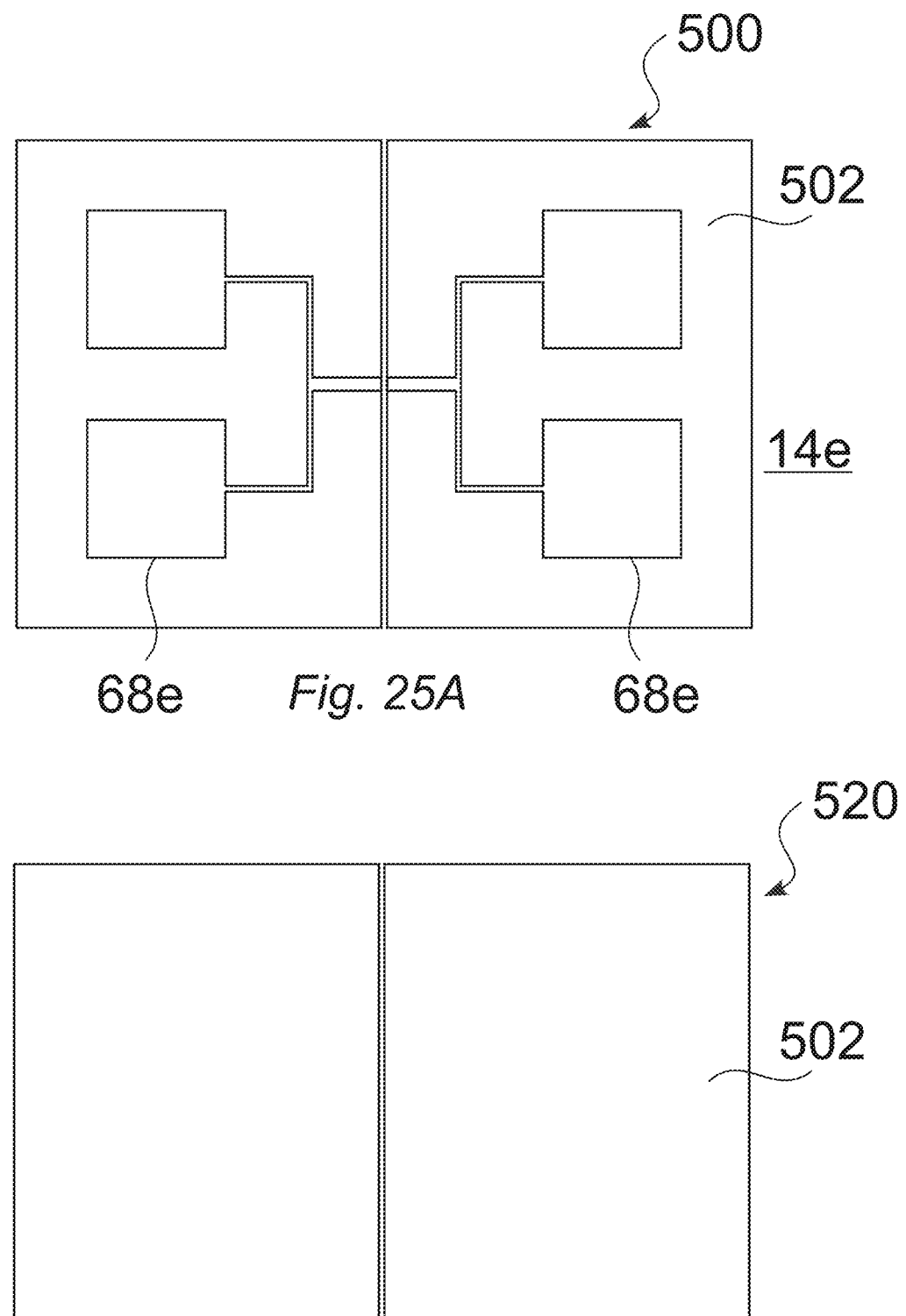
FIGS. 25A and 25B provide a schematic front and rear views of reflector elements for an illustrative embodiment of patch antenna panels.
Figure 26:
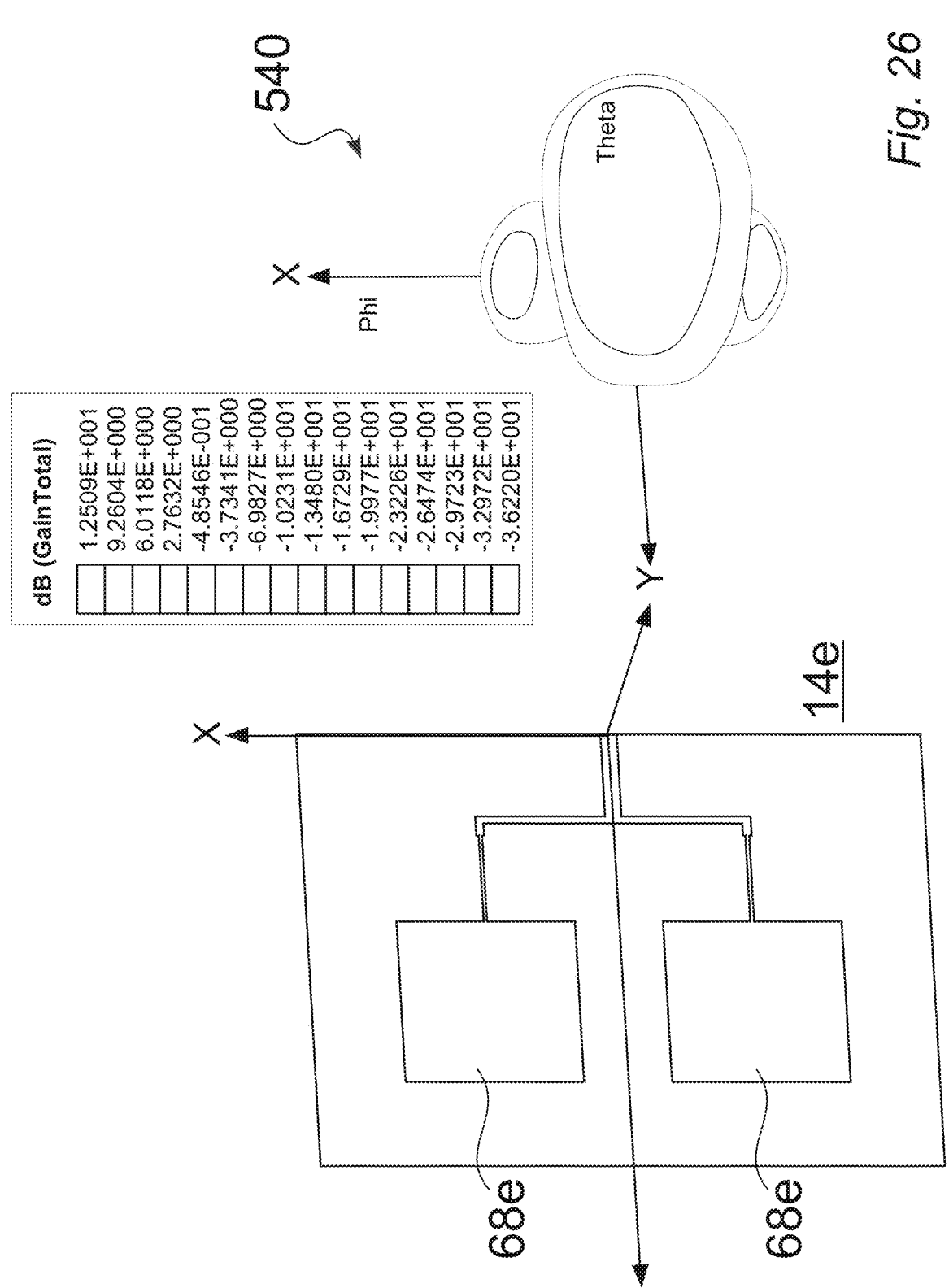
FIG. 26 shows an illustrative far field 3D radiation pattern for a corresponding patch antenna panel embodiment.
Figure 27:
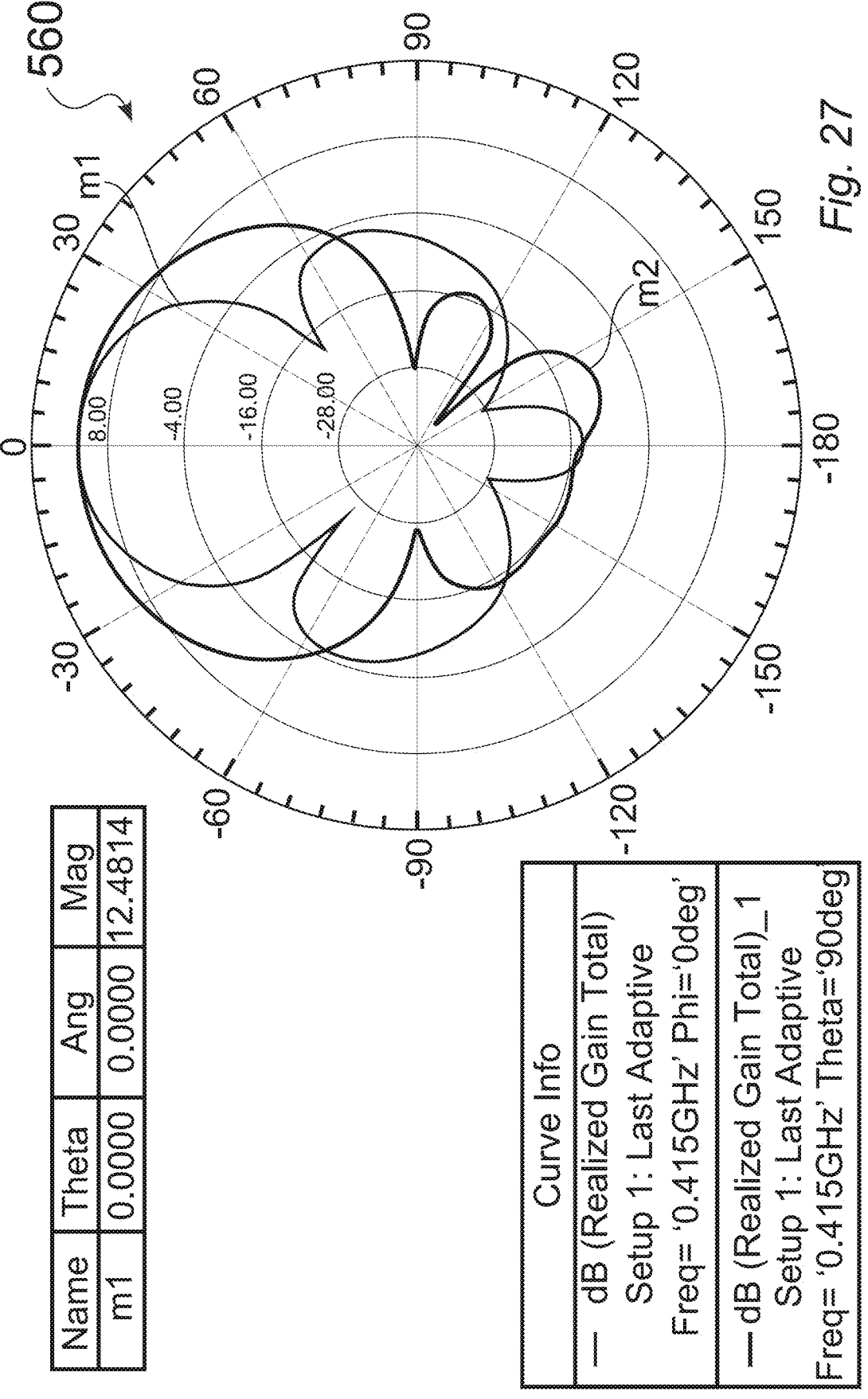
FIG. 27 is a chart that shows vertical and horizontal radiation patterns for an illustrative embodiment of patch antenna panels.
Figure 28:
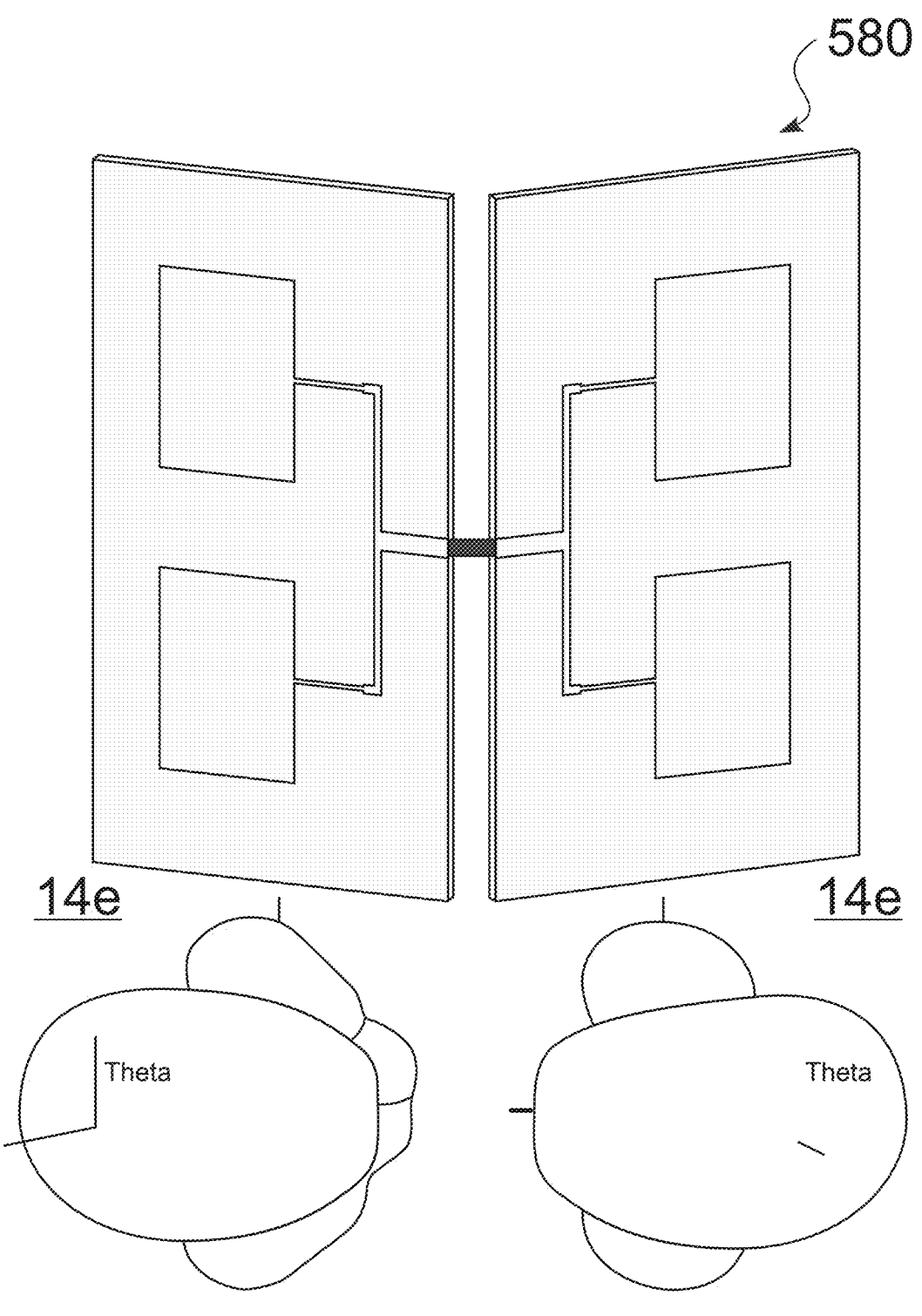
FIG. 28 shows conceptual 3D radiation patterns for two interconnected dual patch antenna panels.

FIGS. 25A and 25B provide schematic front 500 and rear views 520 of reflector elements for an illustrative embodiment of patch antenna panels 14*e*. FIG. 26 shows an illustrative far field 3D radiation pattern 540 for a corresponding patch antenna panel embodiment 14*e*. FIG. 27 is a chart 560 that shows vertical and horizontal radiation patterns for an illustrative embodiment of patch antenna panels 14*e*. FIG. 28 shows conceptual 3D radiation patterns 580 for two interconnected dual patch antenna panels 14*e*.

In an illustrative embodiment of the patch antenna panels 14*e*, the structural framework can include a flat sheet 502 of compressible air foam material, which in some embodiments can have characteristic thickness of 0.25". In some embodiments, the reflector elements 68*e* are configured as a conductive ground plane on one side of the structural framework 502, which in some embodiments is preferably copper foil, and two patch elements 68*e* on the other side of the structural framework 502, which in some embodiments can also preferably include copper foil.

The two dimensional nature of this planar array 14*e* results in a versatile structure which is able to provide a high-gain radiation pattern with a strong front lobe and weak side lobes. In some embodiments, the patch antenna panels 14*e* can be rolled up and stored in a lightweight tube, allowing easy transport and deployment.

In an illustrative implementation of the patch antenna panels 14*e*, each dual patch panel is 49"×36", made of 8 mil copper foil on a 0.25" foam substrate as the structural element, with a ground plane also of 8 mil copper foil. FIG. 26 and FIG. 27 show the radiation pattern for one patch panel with its corresponding ground plane. This arrangement provides the widest gain with deep pattern nulls at +90° and −90°. FIG. 28 shows illustrative radiation patterns for two dual patch antenna panels 14*e*, when their corresponding ground planes are interconnected.

Some alternate embodiments of the passive reflector components 14 can include structural framework comprising a flat sheet, such as made by weaving a suitable fiber such as Kevlar into a mesh sheet. In some mash embodiments, the reflective elements can include metal or metalized fibers that are woven into the mesh. The size, shape, spacing, and grouping of the woven metal wires can be configured to provide the desired reflectivity characteristics for the UHF frequencies involved, e.g., UHF or greater than UHF. In one variation, the arrangement of the reflector elements can be in a 4×4 matrix of the rectangular reflector elements 68, in a manner similar to that of sheet embodiments 14*d*, which can be hung or be placed on a wall.

Other embodiments of the passive reflector components 14 can include a structural framework provided by a rope made of a suitable material, such as Kevlar™ or fiberglass. In an illustrative embodiment, the reflector elements are metal or metalized wires that can be introduced among the fibers to provide a preferred arrangement of reflector elements. The size, shape, spacing, and grouping of the metal wires within the rope are designed to provide the desired reflectivity characteristics for the UHF frequencies involved, e.g., UHF or greater than UHF. In such an embodiment, the wire mesh rope reflector component 14 can be hung from the ceiling of the tunnel ENV, potentially allowing it to be out of the way and be less prone to damage from collisions with vehicles or people traveling through the tunnel. Passive Reflector Components with Inflatable Puck.

Figure 29:
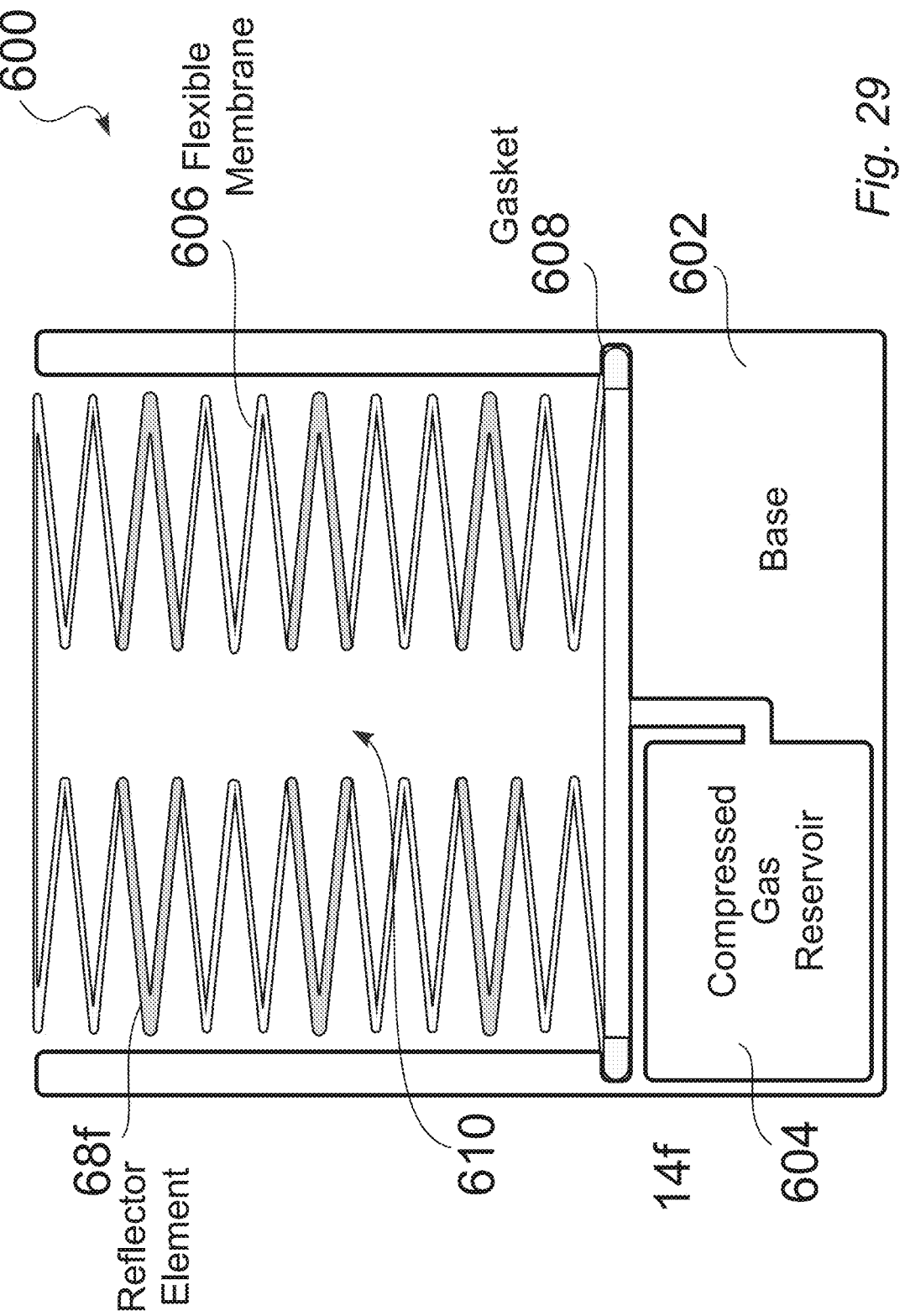
FIG. 29 provides a schematic view of a passive reflector component that includes an inflatable puck having deployable structural elements and reflector elements.
Figure 30:
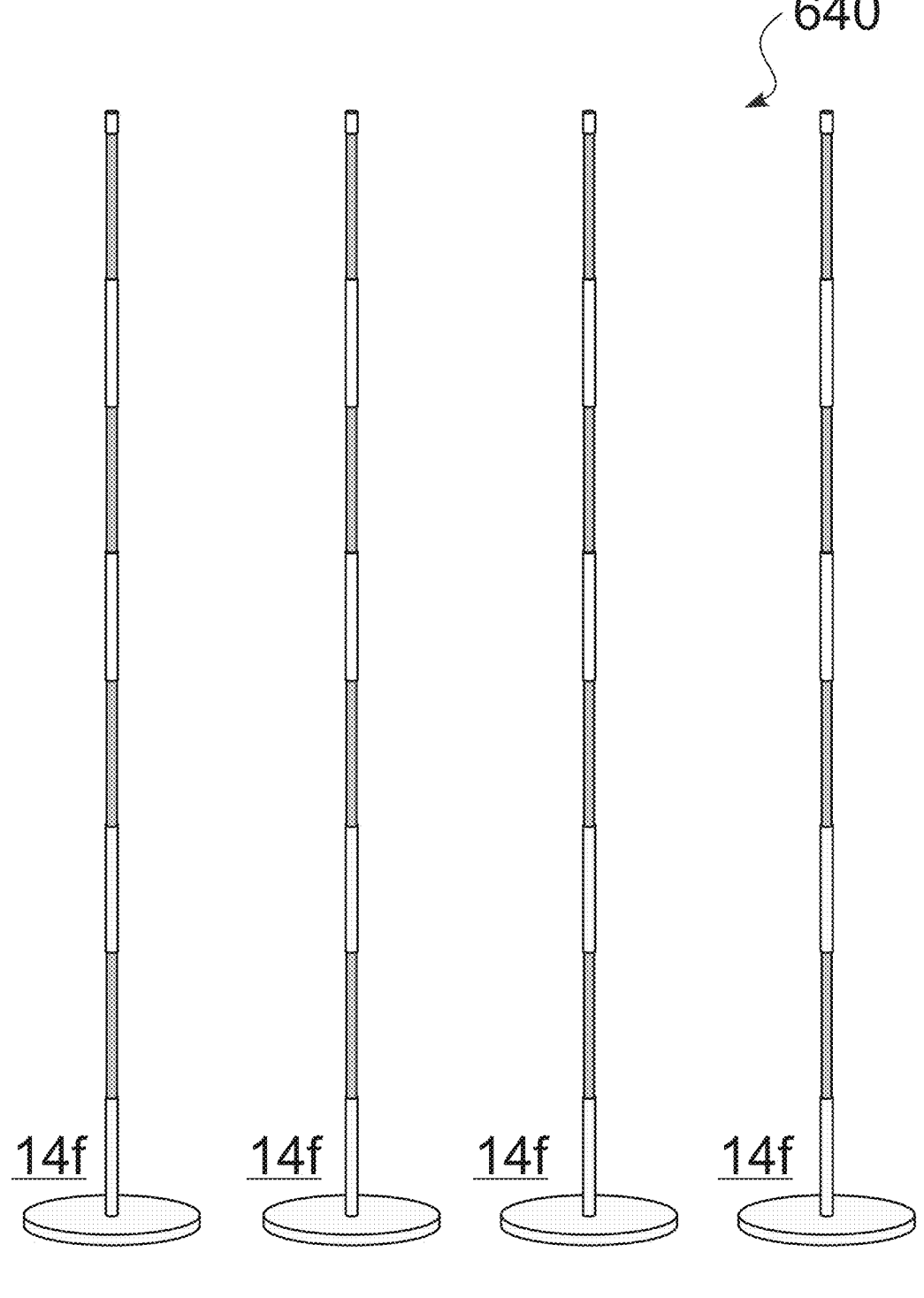
FIG. 30 shows a plurality of inflatable pluck passive reflector components in their deployed state.

FIG. 29 provides a schematic view 600 of a passive reflector component 14*f* that includes an inflatable puck 602 having deployable structural elements 606 and reflector elements 68*f*. When deployed (FIG. 3), the flexible membrane 610 can be inflated to its full height. FIG. 30 shows 610 a plurality of inflatable pluck passive reflector components 68*f* in their deployed state.

In the illustrative passive reflector component 14*f* seen in FIGS. 29 and 30, the structural framework 606 includes a thin-walled plastic tube 606 that can be made rigidly inflated, such as using pressurized air or another pressurized gas (e.g., a carbon dioxide cartridge) 604, or deflated and collapsed to a small size for transport and storage (FIG. 29).

The reflector elements 68*f* are vertically positioned along the axis of the inflatable structural pole 606. In some embodiments, the reflector elements 68*f* can be made of flexible metal tape such as copper tape, affixed to the outer surface of the structural plastic tube 606, to form cylindrical metal tubes when the structural pole 606 is inflated.

As seen in FIG. 29, the base 602 of the illustrative passive reflector component 14*f* contains a compressed gas reservoir 604, which can be used to deploy a flexible membrane 606 with reflector elements 68*f* positioned through its length. Upon deployment, the gas inflates the membrane 606, forming a long rigid tube rising above its container 602, as shown in FIG. 30. The reflector elements 68*f* can be placed coaxially and around the structural pole and are stacked on the pole, such as in a manner resembling the passive reflector component 14*a*. As seen in FIG. 30, one or more passive reflector component 14*f* can be placed on the ground, such as within a constrained environment ENV.

Flat Panel Passive Reflector Components.

Figure 31:
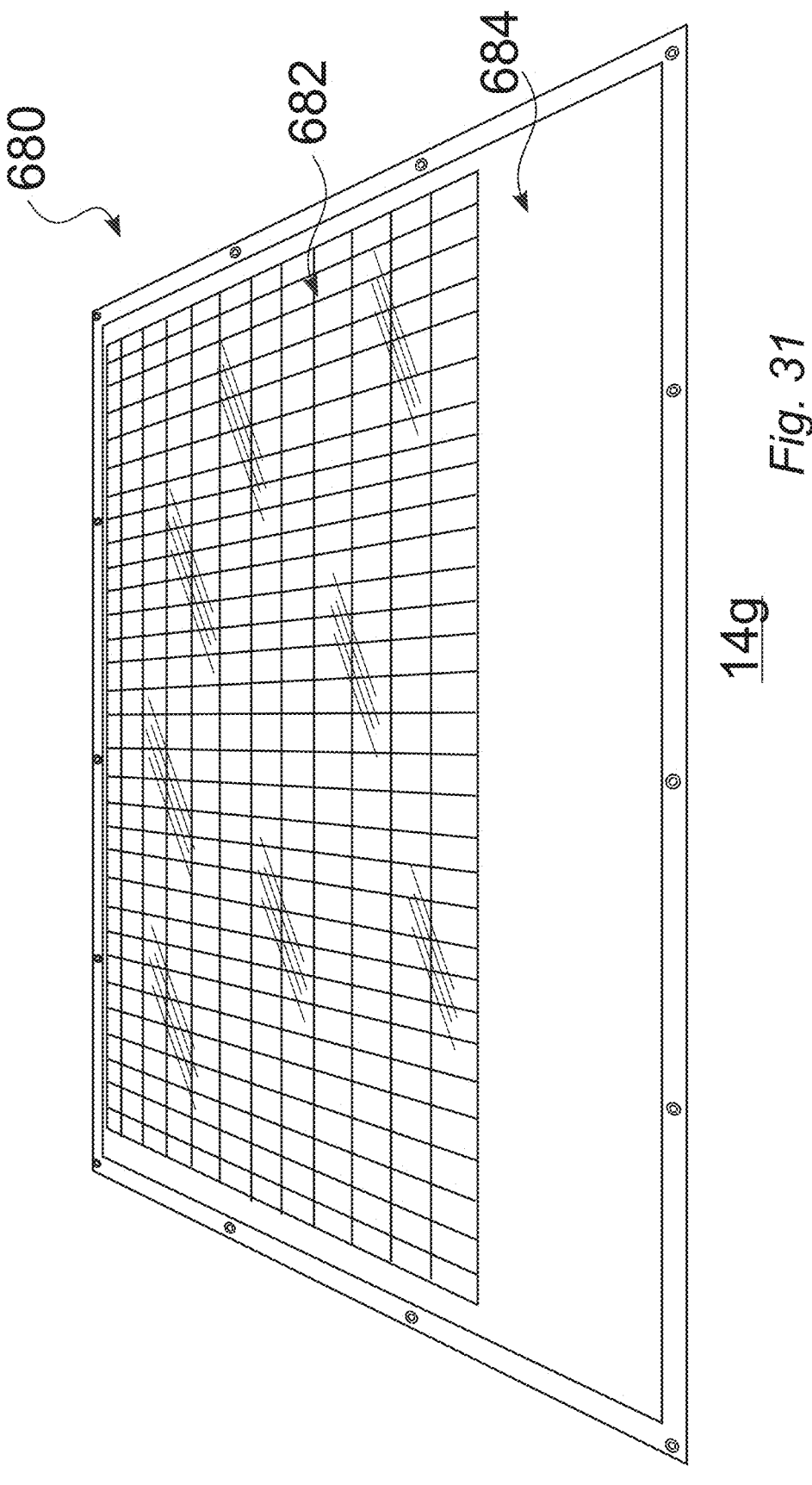
FIG. 31 provides a schematic view of a flat panel passive reflector component, using a metallized reflector element and a plastic tarpaulin structural element.

FIG. 31 provides a schematic view of a flat panel passive reflector component 14*g*, using a metallized reflector element 682 and a plastic tarpaulin structural element 684, which can be hung or mounted to a wall within a constrained environment ENV. The structural framework 684 for the passive reflector component 14*g* can be provided as a flat sheet 684, such as a blanket or a tarpaulin made of a suitable dielectric material. The sheet 684 can be folded into a compact size and shape for ease of transport, and unfolded at the desired installation site ENV.

The illustrative reflective element 682 typically comprises a flat panel of metalized, biaxially-oriented polyethylene terephthalate, commonly known by the brand name Mylar™, which is attached to the structural sheet 684. This approach and construction differs from flat panel passive reflector components 14, e.g., 14*d*, which in some embodiment use rigid sheets of aluminum 68*d*.

The flat panel reflector component 14*g* can be used for a range of frequencies and also provides the highest gain. The upper frequency limitation is a function of reflector flatness. In an illustrative embodiment, surface gaps or roughness must be less than $\lambda/10$. At 400 MHz, $\lambda=29.5$" so flatness must be better than 3". In such an embodiment, at 2300 MHz, $\lambda=5.13$" so flatness must be better than 0.5".

In some embodiments, the illustrative flat panel reflector component 14*g* shown in FIG. 31 uses standard off the shelf survival metalized mylar thermal blankets (~0.5 mil thick). The implementation is designed to be used at communication frequencies of 400 MHz and S-Band (1.8 to 2.3 GHz). The area of the flat panel reflector can be designed according to the equation $$Gr=22.2+40 \log(f)+20 \log(A)+20 \log(\cos \theta)$$

where

Gr=desired two-way gain of reflector in dBi

F=frequency in GHz

A=area of passive reflector in square feet; and $\Theta=\frac{1}{2}$ of the included angle between the incident and reflected paths Dual Pole Vertical Reflector Components.

Figure 32:
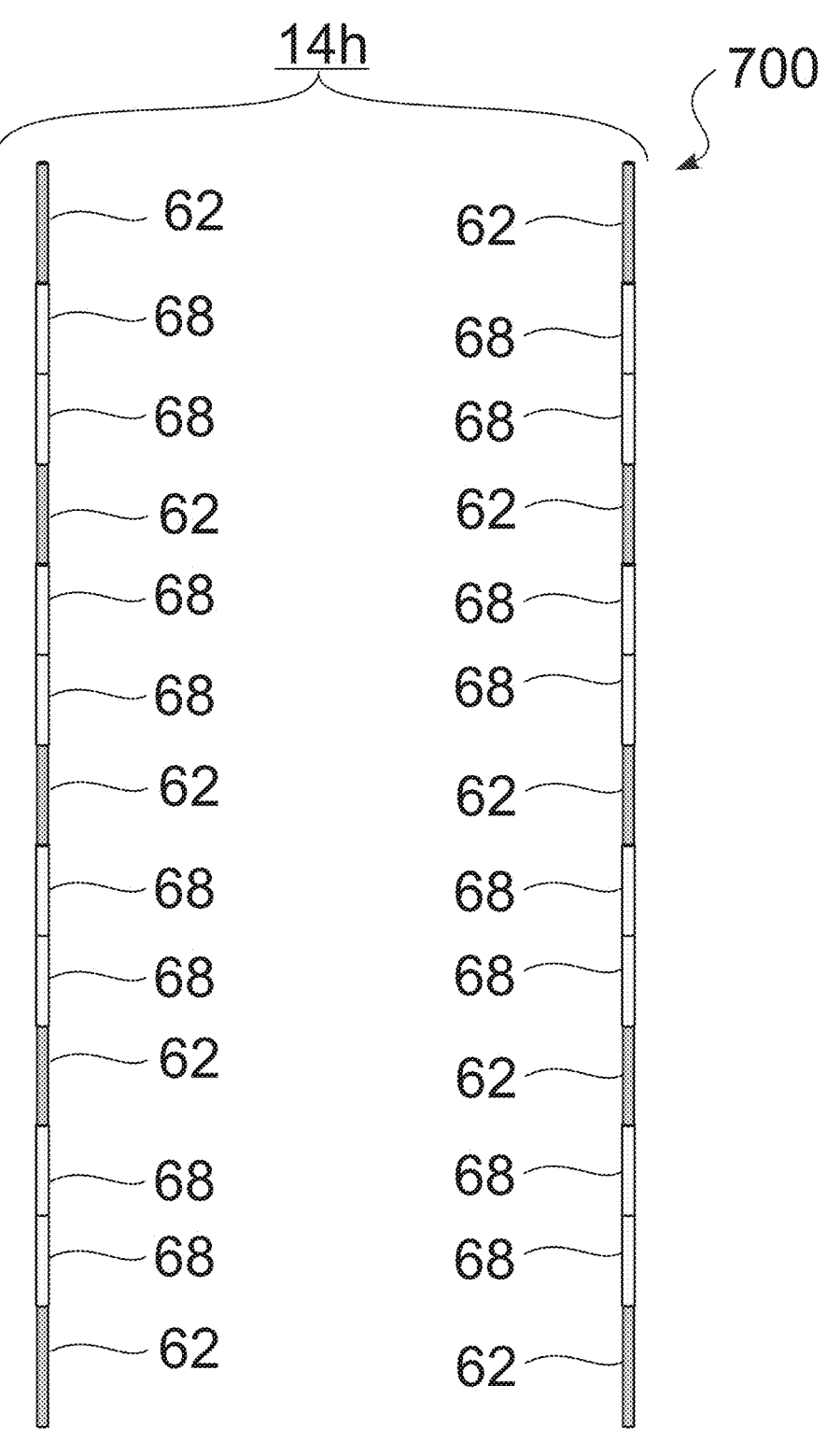
FIG. 32 provides a schematic view of duel pole passive reflector components, wherein each passive reflector component includes a structural pole with coaxially-positioned dual reflectors.

FIG. 32 provides a schematic view 700 of duel pole passive reflector components 14*h*, wherein each passive reflector component 14*h* includes a structural pole with coaxially-positioned dual reflectors 68. In this embodiment 14*h*, the structural framework 62 for the passive reflectors 68 can readily be configured as foldable pole arrangement (FIG. 4), or as an inflatable puck 602 (FIG. 29). The illustrative structural arrangement 62 in FIG. 32 includes two poles 62 spaced at a measured or predetermined distance from each other. As similarly shown in FIG. 4, each of foldable poles can be configured using hollow poles 82 made of a suitable dielectric material such as fiberglass. In some embodiments, an elastic cord 86 is run through the hollow fiberglass poles 86, to serve as a tensioning mechanism. The tubes 821 can be collapsed and folded for transport and storage, and installed at the location by interconnecting the pole segments 82.

In puck component embodiments 14*h*, each of the pair of inflatable pucks 602 can include a thin-walled plastic tube 606 that can be made rigidly inflated, such as using pressurized air or another pressurized gas (e.g., a carbon dioxide cartridge) 604, or deflated and collapsed to a small size for transport and storage.

The reflector elements 68 are vertically positioned along the axis of the structural pole 62. In some embodiments, the reflector elements 68 are preferably hollow cylindrical tubes constructed of a metal such as aluminum and placed coaxially and around the structural pole 62. Alternatively, the reflector elements 68 can be constructed using metal or metalized tape affixed around a hollow tube of any of a variety of materials. In some embodiments, the reflector elements 68 can be arranged as dual elements, e.g., two elements abutting each other, stacked on each of the two poles 68, as shown in FIG. 32, with an appropriate spacing between each pair of dual elements 68.

The length of the reflector elements 68 can be selected to provide resonance at the desired frequency of operation. In some embodiments, the length can preferably approximate half the wavelength ($0.5\lambda$) of the signal, as adjusted by an appropriate adjustment factor corresponding to the material of the reflector 68 and its size and thickness. The distance from the center of one reflector element 68 to the center of the next reflector element 68 can correspond to approximately $0.75\lambda$, which can be adjusted as discussed above.

A specific illustrative embodiment of the dual-pole reflector component includes eight aluminum reflector elements 68, eight dielectric fiberglass support poles 62, and two aluminum support bases 70 (FIG. 3).

To support an illustrative UHF radio frequency of 400 MHz, the reflector element length can be optimized to be 13.1" for resonance, using a $0.5\lambda$ length, adjusted by an adjustment factor of 0.888. The center-to-center distance between two adjacent reflectors can be optimized to 20.1", or $0.75\lambda$ using the same adjustment factor. The two support poles are placed 42" apart. This arrangement provides a total maximum gain of 11.0 dBi. The antenna dimensions including the support structure are 42"×0.625"×80".

Figure 33:
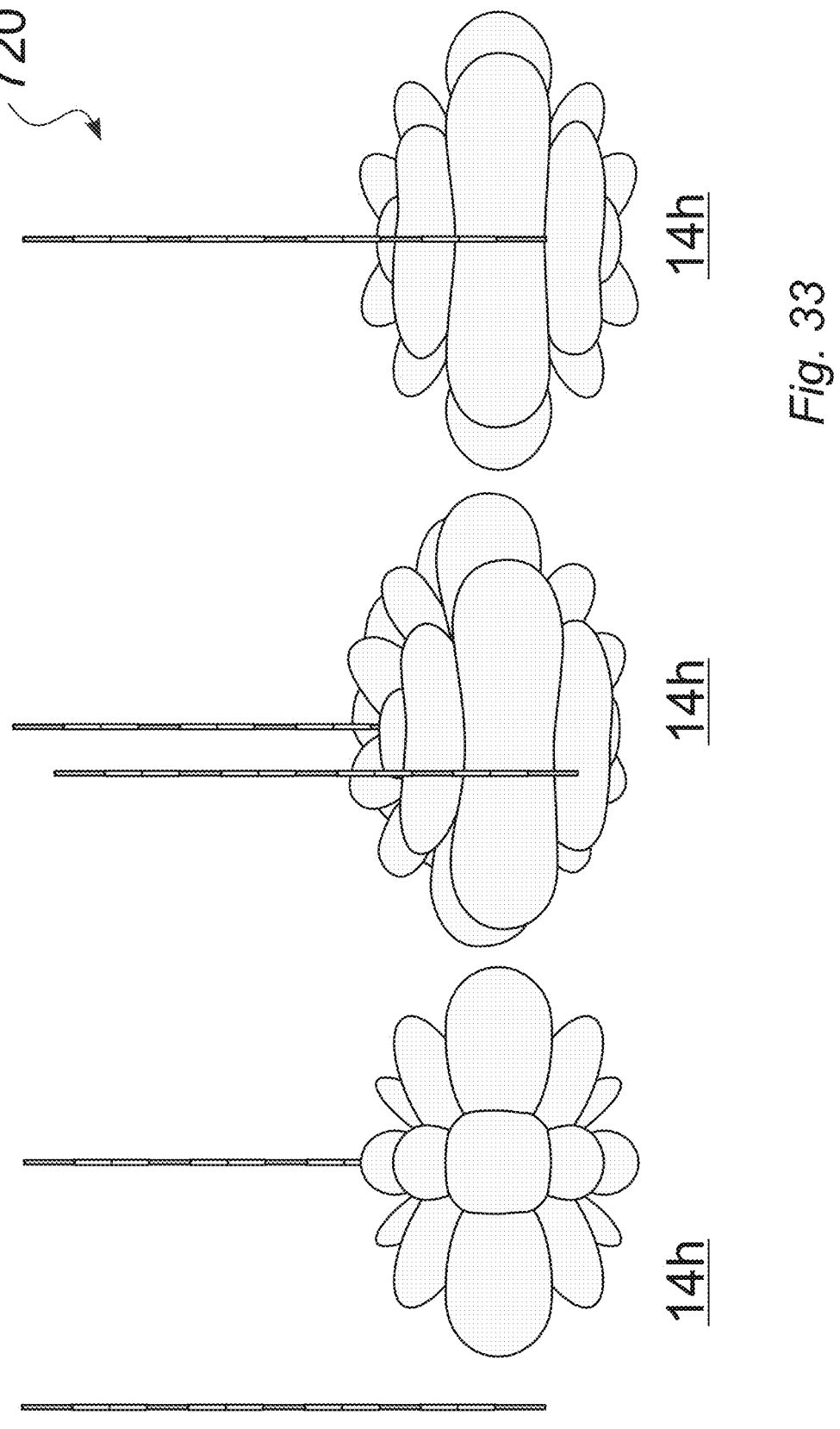
FIG. 33 shows 3D radiation patterns for one reflector element in a duel pole passive reflector.
Figure 34:
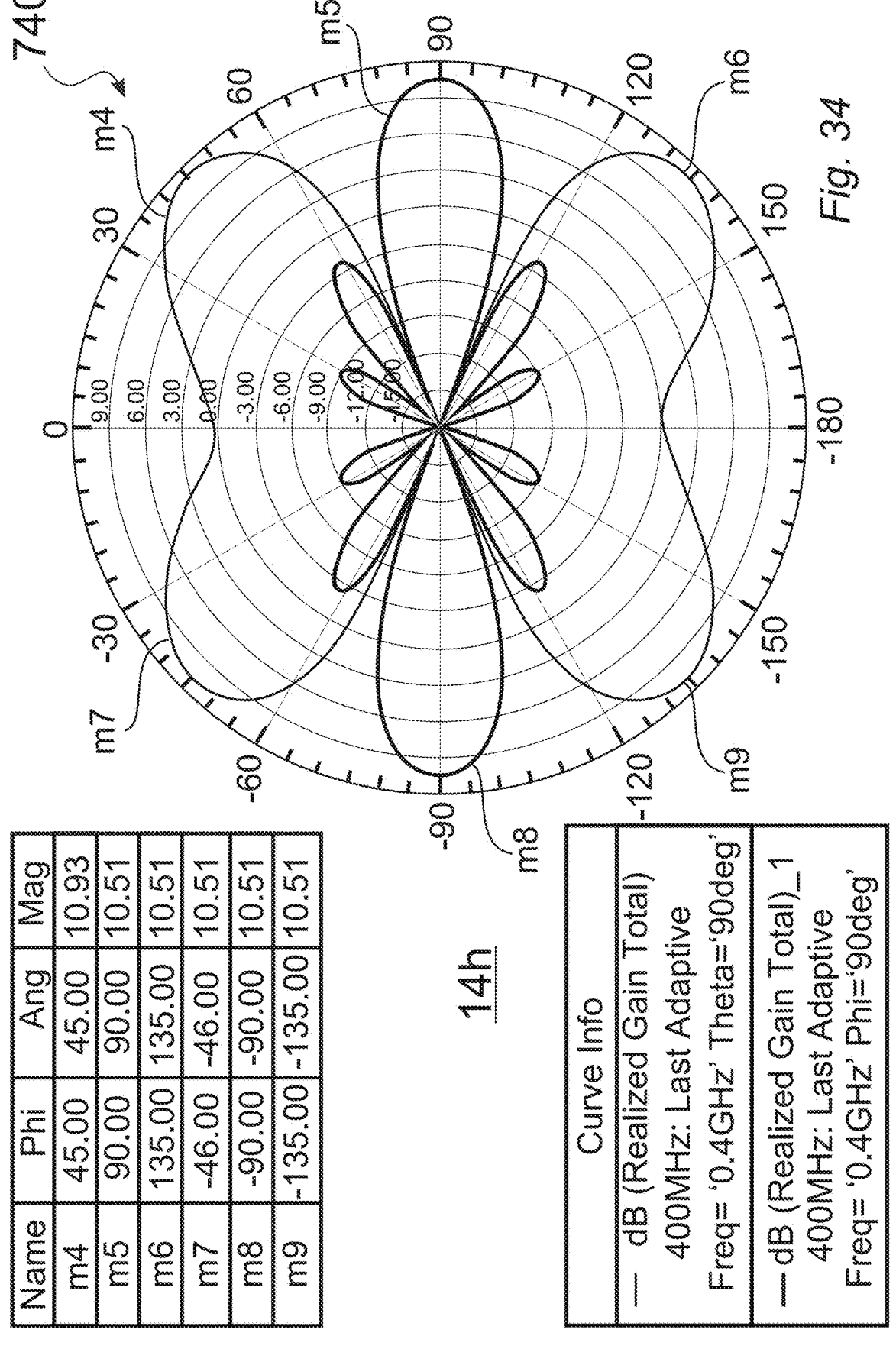
FIG. 34 is a chart that shows vertical and horizontal radiation patterns for one reflector element of an illustrative dual pole reflector assembly.

FIG. 33 shows 3D radiation patterns 720 for one reflector element in a duel pole passive reflector. FIG. 34 is a chart 740 that shows vertical and horizontal radiation patterns for one reflector element of an illustrative dual pole reflector assembly.

Figure 35:
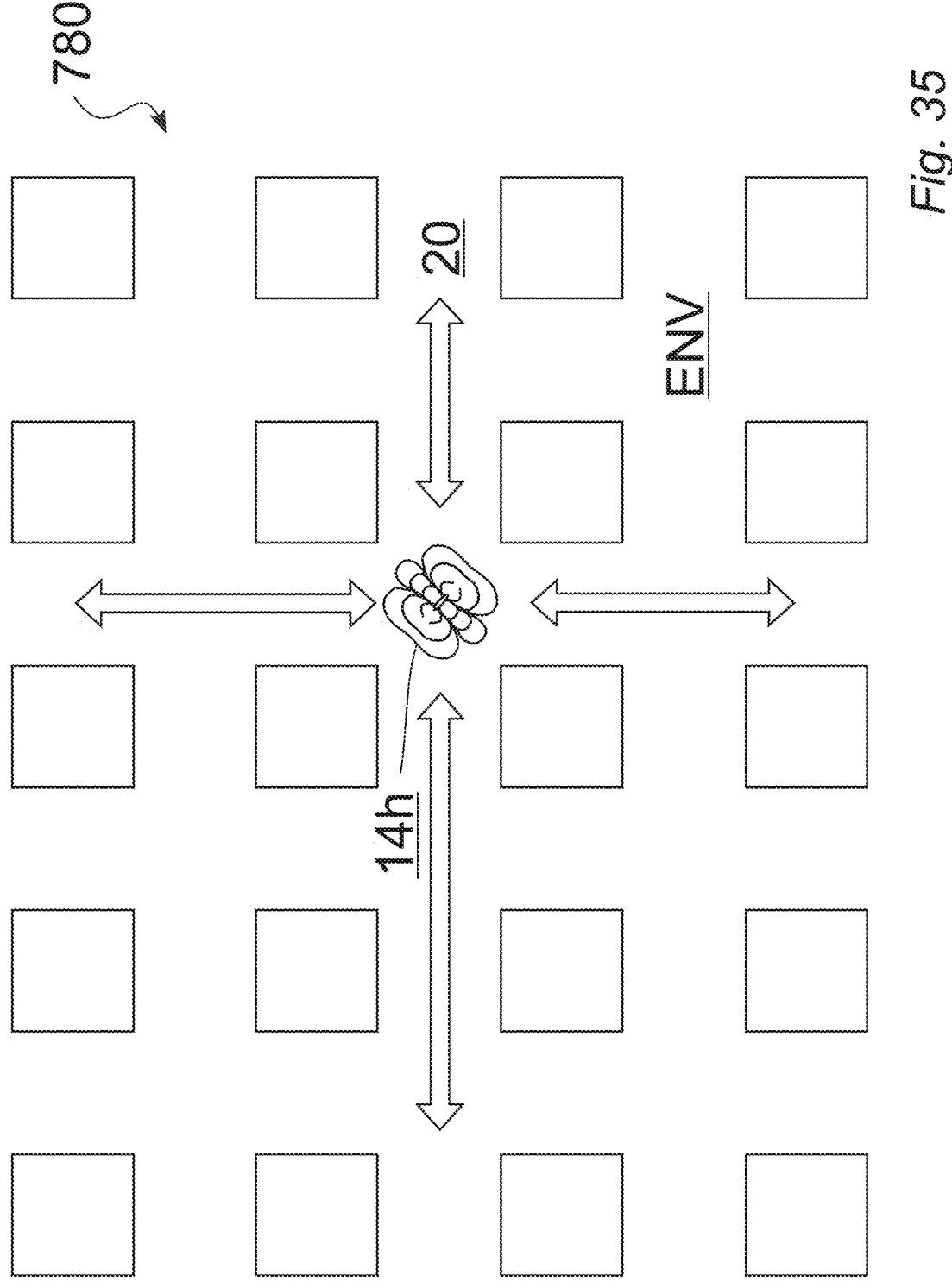
FIG. 35 is a schematic diagram 780 for illustrative placement of a dual pole reflector assembly 14h in a tunnel network, which shows corresponding radiation patterns and preferred communication directions.

FIG. 35 is a schematic diagram 780 for illustrative placement of a dual pole reflector assembly 14*h* within a constrained environment ENV. FIG. 35 also shows corresponding radiation patterns and preferred communication directions for a dual pole reflector assembly 14*h*. As seen in FIG. 35, one or more dual pole reflector assembly 14*h* can be placed on the ground in a tunnel network ENV.

Helical Wire Reflector Components.

Figure 36:
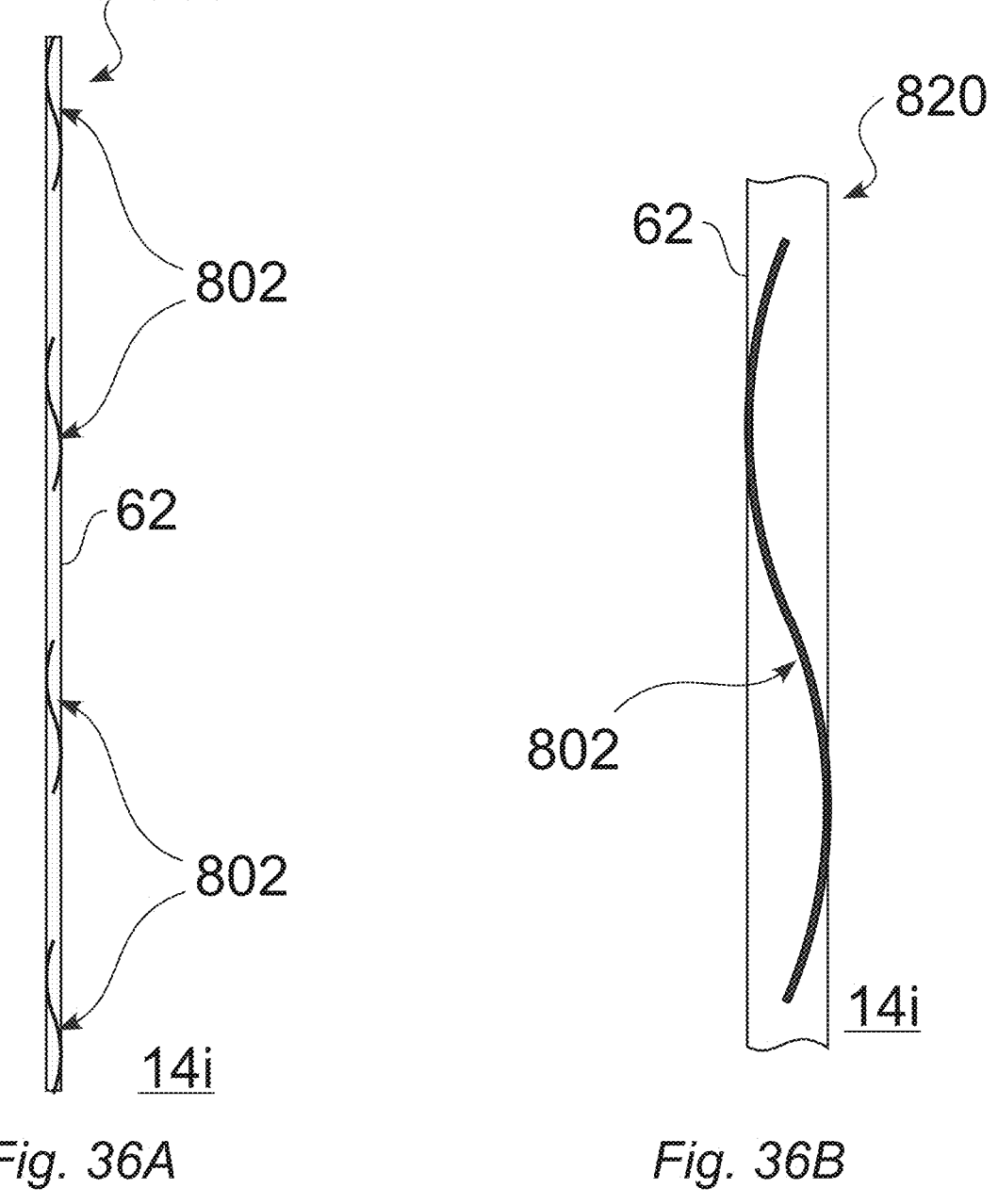
FIGS. 36A and 36B are a schematic diagrams 800, 820 for illustrative helical wire reflector components.

FIGS. 36A and 36B are schematic diagrams 800, 820 for illustrative helical wire reflector components 14*i*. In this embodiment 14*i*, the structural framework 62 for the passive helical wire reflectors 802 can readily be configured as foldable pole arrangement (FIG. 4), or as an inflatable puck 602 (FIG. 29).

In this embodiment 14*i*, the structural framework 62 for the passive helical wire reflectors 802 can readily be configured as foldable pole arrangement (FIG. 4), or as an inflatable puck 602 (FIG. 29).

The foldable pole arrangement uses hollow poles 82 made of a suitable dielectric material such as fiberglass. An elastic cord is run through the hollow fiberglass poles, serving as a tensioning mechanism. The tubes 82 can be collapsed and folded for transport and storage, and installed at the location by interconnecting the pole segments 82.

The inflatable puck structural arrangement uses a thin-walled plastic tube 606 (FIG. 29_that can be made rigidly inflated, such as using pressurized air or another pressurized gas (e.g., a carbon dioxide cartridge) 604, or deflated and collapsed to a small size for transport and storage.

The reflector elements 802 are made of conductive wire that can be helically wound around the structural pole 62 and/or vertically positioned along the axis of the inflatable structural pole 606 as shown in FIG. 36B.

As an example, a specific implementation 14*i* includes four separate helical turn wires 802, which can be mounted around an inflatable tube 606, that serves as the structural element 62.

Figure 37:
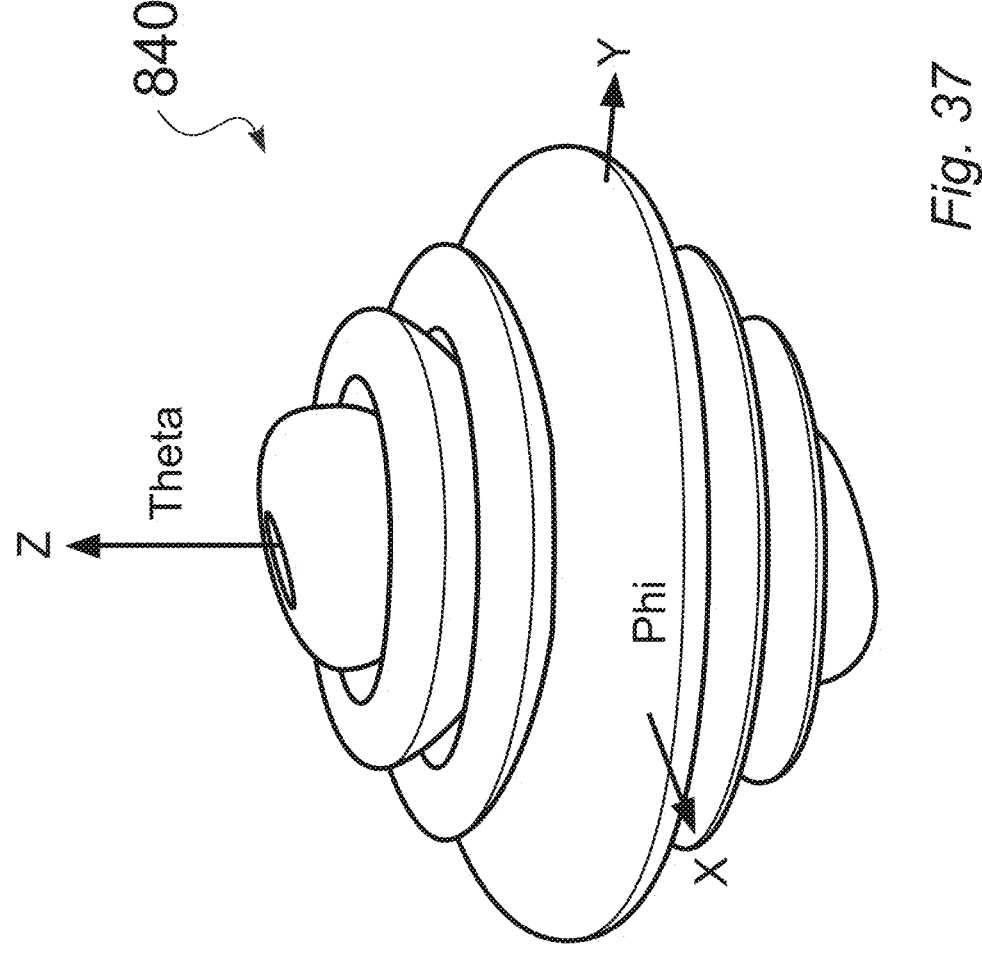
FIG. 37 shows 3D radiation patterns for one helical wire reflector element associated with a helical wire reflector component.
Figure 38:
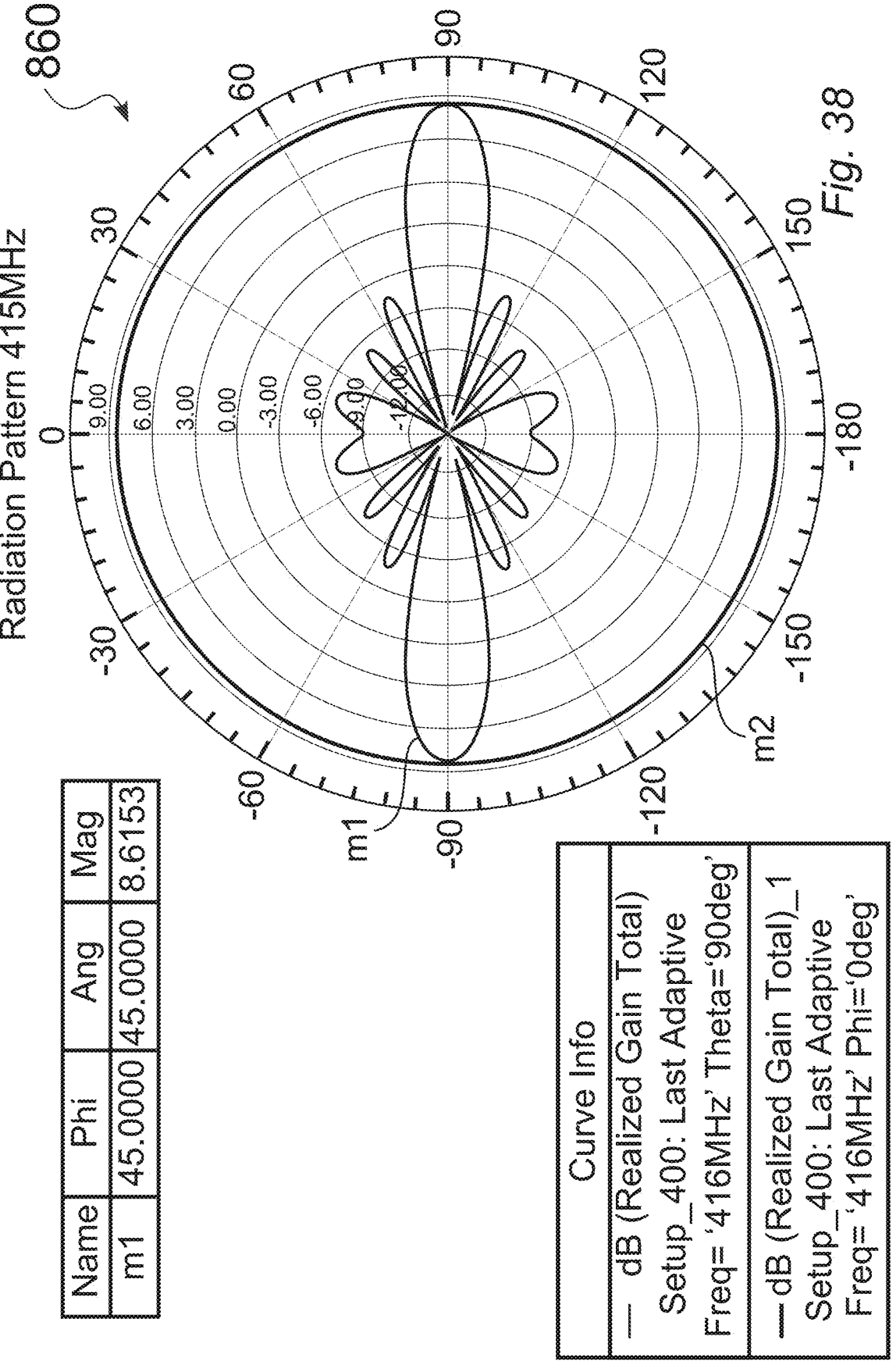
FIG. 38 is a chart that shows vertical and horizontal radiation patterns for one helical wire reflector element associated with a helical wire reflector component.

FIG. 37 shows 3D radiation patterns 840 for one helical wire reflector element associated with a helical wire reflector component. FIG. 38 is a chart 860 that shows vertical and horizontal radiation patterns for one helical wire reflector element associated with a helical wire reflector component 14*a*. To support an illustrative UHF radio frequency of 400 MHz, the reflector element length can be optimized to be 13.5" for resonance, using a $0.5\lambda$ length, adjusted by an adjustment factor of 0.915. The end-to-end distance between two adjacent reflectors can be optimized to 12.6". This arrangement provides a total maximum gain of 8.6 dBi. In some embodiments, the helical wire reflector components 14*i* can be placed on the ground, such as within a constrained environment ENV.

Rapid Deployment Methods.

The passive reflectors of the various embodiments above can be deployed by a person or in an automated manner.

In some embodiments, a person USR can travel through the tunnels, installing the passive reflectors 14 at appropriate locations within a constrained environment ENV, such as at corners, at intersections, at predetermined positions, or at locations where a signal detector indicates diminished reception.

For instance, a signal source can be established at the entrance to a mine, and is set up to emit radio waves at a determined frequency. A vehicle that can traverse the mine tunnels is outfitted with two receivers, one at the front and one at the rear of the vehicle. A number passive reflectors 14 are carried on the vehicle or by a human for deployment. As the vehicle travels through the tunnels, there will be locations where the front receiver passes outside the range of the source signal while the rear receiver still has reception. The passive reflectors 14 can be deployed at this location, as it would be well suited for the installation of a repeater system.

In some embodiments, the deployment of illustrative embodiments of the passive reflector components 14 can be carried out by an occupant of the vehicle, or dropped from a vehicle driving through the space. Automatic deployment can take place when a turn is made, or a sensor detects that the received signal has diminished to need a reflector 14. The sensor can be mounted on the front of the vehicle to give time for reflectors to be deployed from the rear before going around the corner of a tunnel. Embodiment 8 (the inflatable puck) can be enabled to inflate and deploy automatically when dropped on the ground.

Passive reflector components 14 can be designed in form factors that are compact to transport and at the same time are amenable to automatic, quick deployment or unfurling. For example, the above-described approach can also be used with the foldable pole and sheet passive reflector designs. In particular, the sheet designs of reflector component embodiments 14*d*, 14*e* and 14*g* can be quickly deployed by attaching the top edge to a wall and allowing gravity to unroll and thus deploy them.

In other system embodiments 10, embodiments 15 that are based on a sheet or mesh system can be implemented on a mesh fabric panel with a flexible frame that can be twisted into a compact shape and that, when released, unfolds into its full size. In another variation, a self-righting pyramid structure can be used as the structural framework. When dropped to the ground, the system arranges itself into a configuration that is conducive to passive reflection of the desired frequencies.

Alternative Embodiments

While the invention is described above in the context of radio communications in underground and constrained environments such as mine tunnels, the invention can also be extended to a variety of other applications. Some examples are provided in this section.

Deployment in a Diversity of Devices and Frequencies.

While the deployment of embodiments of the invention are described as multiple instances of the same embodiment, it will readily be seen that different embodiments of the passive reflector components can be utilized and can work together to provide a specific communication requirement.

As an example, a tunnel may have sections that are tall and narrow, where implementations of passive reflector components 14*a*, 14*b*, 14*c* and/or 14*h* can be deployed, as well as other sections that are low with walls that accommodate passive reflector components 14*d*, 14*e*, 14*f* and/or 14*i*.

Embodiments of the passive reflector components 14 can also work in conjunction with other equipment that operates in the same frequency. As an example, embodiments of the passive reflector components 14 may be used along with active repeaters, providing a flexible solution to users who may have a diverse inventory of available equipment.

The passive reflector components 14 provide gain and signal reflectivity capability in a range of frequencies around the specific frequency they are designed for. This permits flexibility in the choice of signal frequencies.

Exploration of Caves and Underground Complexes.

The exploration and survey of underground features such as caves, tunnels, cenotes, lava tubes, and abandoned mines, is carried out in constrained conditions, with little or no knowledge of the terrain and the layout of underground pathways. In such applications, radio signals from an external source will have limited reach, and repeaters will be needed to ensure communications for the exploring party. It will be impractical for an exploring party to carry arbitrary numbers of active repeater equipment with associated wiring or battery systems and deploy them to maintain radio communications with the surface. The various embodiments of the portable deployable underground communication system described above can be more easily carried in large numbers, deployed quickly as required at locations, take up little space in constrained environments, and provide passive performance.

Search and Rescue.

Some embodiments of the invention can be utilized in search and rescue missions. For example, an earthquake in an urban area may result in damage to existing communications and electrical infrastructure. As rescue crews navigate the rubble, they would benefit from portable deployable radio communication systems that could provide an effective communications link to a base location. Rescuers would be able to carry lightweight systems that would auto-deploy when positioned, and by deploying them at regular intervals, adequate signal strength can be obtained. Similar applications can also be considered in search and rescue operations in outdoor environments such as wooded areas, mountainous terrain, or even open country where communications and power infrastructure are not readily available and the needs of the situation are rapidly evolving.

Communications in Mountainous Terrain.

Practical applications of the disclosed passive reflector communications systems can also be found in mountainous or otherwise challenging terrain where line of sight communications may be occluded by natural or man-made features. For example, it is common for mobile cellular telephone signals to have limited reach in mountainous regions, even in large urban areas where communications infrastructure is typically densely available. For example, a narrow valley branching out of a canyon can serve a small population of residents. A passive reflector system would be a practical and effective solution. Further, the invention's portability and deployability characteristics allow installation in potentially constrained locations such as high ridges or narrow roadside walls in canyons. As an example, passive reflector component 14d can be deployed on a water tower to provide coverage in challenging terrain.

Covert and Military Operations.

In covert or military operations, there may be an existing radio communications infrastructure; however, it may be unavailable to the military team who will need to operate using different equipment and radio frequencies. The team can carry portable radios operating in a secure band, and use the portable deployable passive reflectors of the invention to extend signal coverage to their evolving areas of operation. This solution has the additional benefit that the discovery or capture of the passive reflector systems by an adversary will not have the effect of compromising the secure communications frequency for future missions, as no active equipment is left behind.

System Testing and Alternate Embodiments

Figure 39:
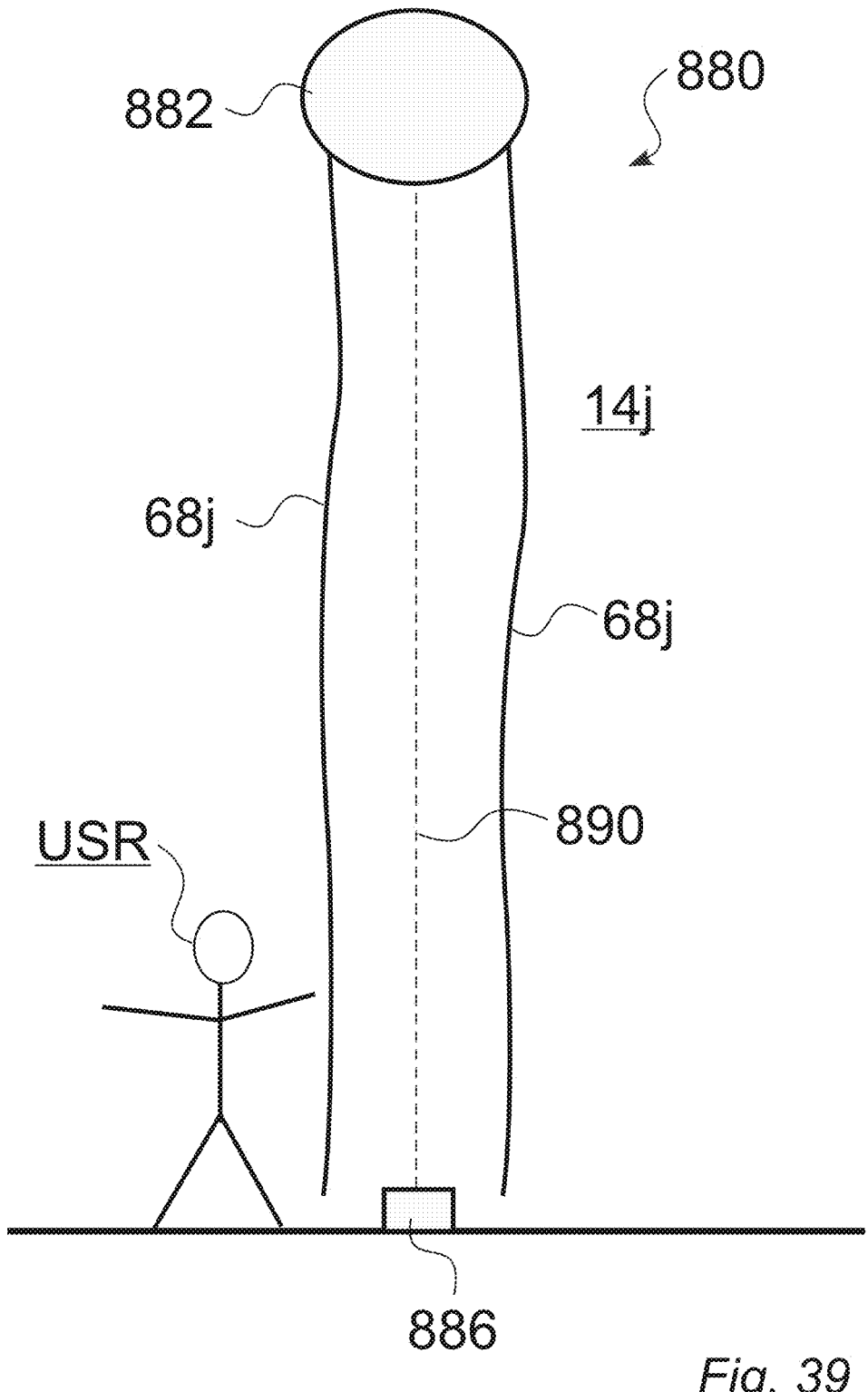
FIG. 39 is a schematic diagram 880 of a deployed balloon reflector component in a tunnel network.
Figure 40:
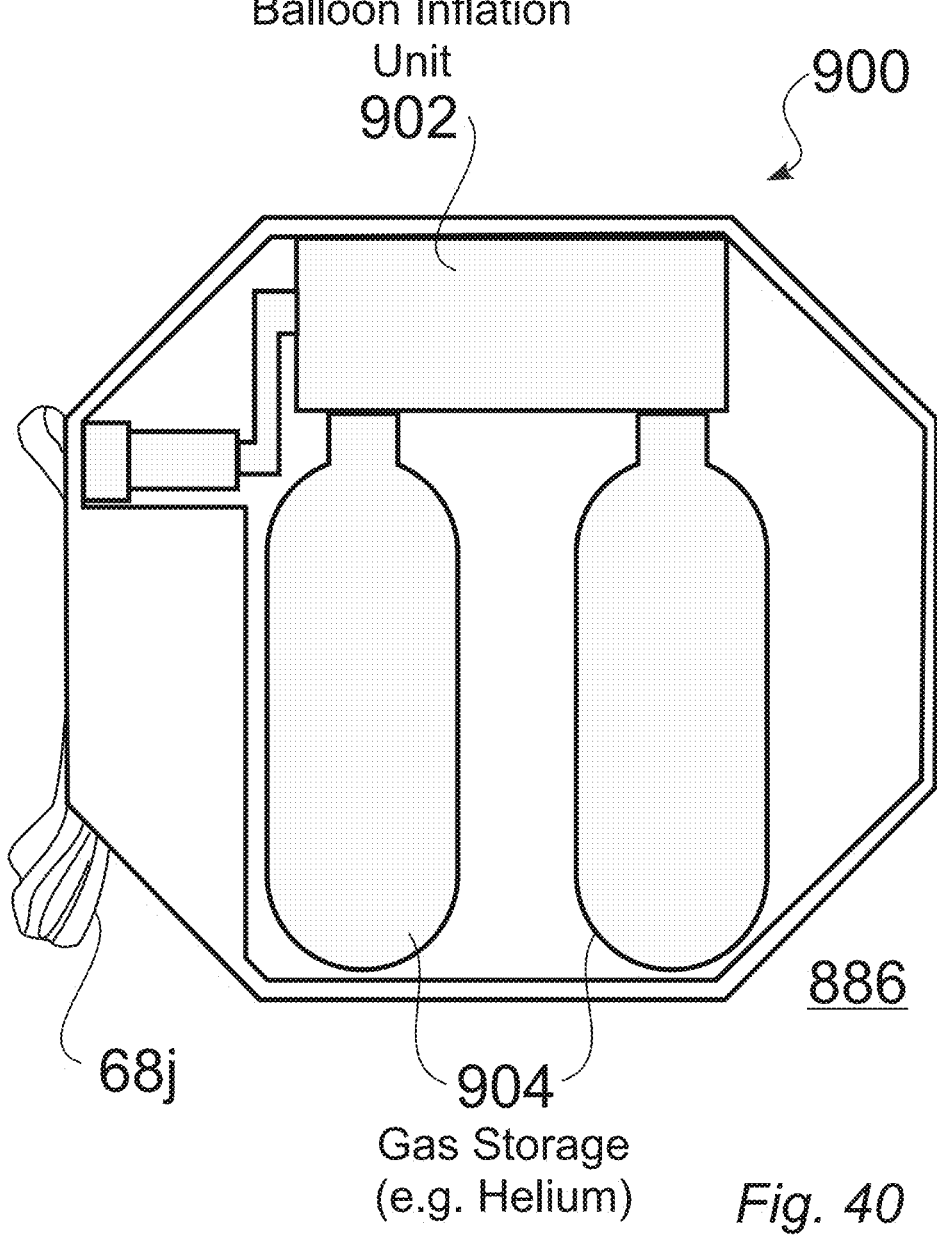
FIG. 40 is a schematic view of a deployment module for a balloon reflector component.

FIG. 39 is a schematic diagram 880 of a deployed balloon reflector component 14j in a tunnel network, which includes vertical strip reflectors 68j, e.g., for L-Band or S-band operation, that are attached to a balloon 882, in which the balloon 882 can be deployed 890 within a constrained environment ENV, such as from a deployment module 886, such as a puck structure 886 containing one or more gas cylinders 906, e.g., helium cartridges 904 and a corresponding balloon inflation mechanism 902. FIG. 40 is a schematic view 900 of a deployment module 886 for a balloon reflector component 14j. In some illustrative embodiments of the balloon reflector components 14j, the vertical strip reflectors 68j are optimized for S-Band operation, in which the vertical strip reflectors 68j are 2.25"L×¼"W, with 2.5" space between elements. In some illustrative embodiments of the balloon reflector components 14j, the vertical strip reflectors 68j are optimized for L-Band operation, in which the vertical strip reflectors 68j are 3.95"L×¼"W, with 4.5" space between elements.

Different embodiments of passive reflector components 14 were installed and tested within an underground environment ENV, to investigate different methods for underground communication in the L-band and S-Band frequency range. The testing was performed using an array of self-supporting planar tarp components 14 and helium balloon multi-band vertical strip reflectors 14j.

The wireless radios 18 used during the testing were Model MPU5 Wave Relay Networked and Digitally Encrypted communication radios 18, e.g., 18a, 18b (FIG. 1), available through Persistent Systems LLC, of New York, NY. During the testing, one of the radios 18a was located in a fixed position, while the other radio 18b was movable within the constrained environment ENV. Two computers were also used, one to program the radio's RF modules, and the other to monitor and record the signal to noise ratio (SNR) of the MPU5s 18.

During some of the testing procedures, the radios 18 were evaluated at both 1370 and 2400 MHz, in which the first radio 18a was located approximately 1000 feet from a 90 degree turn, at a fixed position, and win which starting position of the second radio 18b was line-of-sight or 1000 feet away from the first radio 18a at a 90 degree turn position, then moved away to a maximum distance of 2000 feet from the 90 degree turn (or 3000 feet total distance away from the first radio's position). Signal to Noise Ratio (SNR) data for the signals 20 was recorded as the second radio 18b moved further away from the 90 degree turn location. This testing was repeated, both without and with different embodiments of passive reflector components 14 located at the 90 degree location.

The results of the testing indicated an increased distance of at least three times for voice communication using the passive reflector components 14. For example, without the use of passive reflector components 14 during testing, loss of communications occurred at 1300 to 1400 feet.

For similar test conditions, with the use of passive reflectors 14, no loss of communications occurred at 3000 feet, which was the maximum available tunnel distance. There was still a 12 to 25 dB communications margin at 3000 feet (dependent on reflector size and frequency).

Design and evaluation can also be carried out on different sizes and types of passive reflector components 14, to provide expected underground communications coverage vs. aperture, in an existing tunnel or other constrained environment ENV. For instance, the performance of different passive reflector components 14 can be evaluated for different shaped tunnels, such as to provide optimal passive reflectors and polarization guide lines.

The following is a summary of performance and technical details of the tested L & S Band High Gain Tarp Reflectors:

L & S Band Maximum Digital Voice Communication Coverage without Reflector:
  1300 to 1400 feet (1000 feet to 90 deg turn then an additional 300 to 400 feet).

L & S Band Minimum Digital Voice Communication Coverage with Reflector:
  3000 feet (1000 feet to 90 deg turn [at Reflector] then an additional 2000 feet)
  CW Signal to Noise Ratio at 3000 feet: 35 to 37 dB (L-Band) and 40 to 42 dB (S-Band)
  MPU5—Digital Voice Communication Margin at 3000 feet: 25 to 27 dB (L-Band) and 30 to 32 dB (S-Band).

L & S Band Tarp Reflector Details (usable for either Horizontal or Vertical polarization):

Size: 8×8 feet w/support, 6×8 feet (reflector), deployed in horizontal polarization Number of Elements: 121 (L-Band), 380 (S-Band)

Directivity: Analysis predicts 26 dBi (L-Band), 31 dBi (S-Band)

Reflector Materials: Polyethylene w/reinforced fiberglass and 0.001" thick Cu elements.

The following is a summary of performance and technical details of the tested L & S Band—Dual Band Vertical Strip Reflectors:

L & S Band Maximum Digital Voice Communication Coverage without Reflector:

1300 to 1400 feet (1000 feet to 90 deg turn then an additional 300 to 400 feet).

L & S Band Minimum Digital Voice Communication Coverage with Reflector:

3000 feet (1000 feet to 90 deg turn [at Reflector] then an additional 2000 feet)

CW Signal to Noise Ratio at 3000 feet: 22 to 24 dB (L-Band) and 24 to 26 dB (S-Band)

MPU5—Digital Voice Communication Margin at 3000 feet: 12 to 14 dB (L-Band) and 14 to 16 dB (S-Band)

L & S Band Vertical Strip Reflector Details:

Size: 0.25 inch wide×12 feet tall (reflector)

Number of Elements: 18 (L-Band), 31 (S-Band)

Directivity: Analysis predicts 15 dBi (L-Band), 17 dBi (S-Band)

Reflector Materials: Nylon ribbon with 0.001" thick Cu elements

Weight: 15 grams each (L/S-Band vertical arrays)

Unless contrary to physical possibility, it is envisioned that (i) the methods/steps described above may be performed in any sequence and/or in any combination, and that (ii) the components of respective embodiments may be combined in any manner.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended examples. Accordingly, the specification, drawings, and attached appendices are to be regarded in an illustrative sense rather than a restrictive sense.

What is claimed is:

1. A signal reflecting device comprising:
a reflector array configured to reflect wireless communication signals, wherein the reflector array further comprises a first plurality of reflector elements configured with a first directional alignment and a second plurality of reflector elements configured with a second directional alignment that is perpendicular to the first directional alignment, wherein the plurality of reflector elements with the first directional alignment are further configured to form a plurality of reflector crossed pairs with the plurality of reflector elements with the second directional alignment,
a structural framework coupled to the reflector array, the structural framework having a third directional alignment that is perpendicular to each of the plurality of reflector crossed pairs, wherein the structural framework further comprises a third plurality of reflector elements and a plurality of dielectric portions such that each reflector element of the third plurality is configured along the third directional alignment and intersects one of the plurality of reflector crossed pairs; and each of the dielectric portions is configured along the third directional alignment between neighboring reflector elements of the third plurality of reflector elements.

2. The device of claim 1, wherein the reflector elements are configured to passively reflect wireless communication signals.

3. The device of claim 1, wherein the first directional alignment is in a horizontal direction.

4. The device of claim 3, wherein the second directional alignment is in a horizontal direction.

5. The device of claim 1, wherein the third directional alignment is in a vertical direction.

6. A signal reflecting device comprising:
a reflector array configured to passively reflect wireless communication signals, wherein the reflector array comprises a plurality of horizontally crossed reflector elements pairs,
a structural framework, coupled to the reflector array, comprising a plurality of reflector elements and a plurality of dielectric portions each having a vertical alignment with respect to the plurality of crossed reflector element pairs, such that each vertically aligned dielectric portion intersects one of the plurality of reflector crossed pairs; and each of the vertically aligned reflector elements is configured between neighboring dielectric portions.

\* \* \* \* \*